(12) United States Patent
Weilert et al.

(10) Patent No.: US 11,698,269 B2
(45) Date of Patent: Jul. 11, 2023

(54) SYSTEMS AND METHODS FOR RESOLVING POINTS OF INTEREST ON MAPS

(71) Applicant: Apple Inc., Cupertino, CA (US)

(72) Inventors: Shanni A. Weilert, San Jose, CA (US); Ryan Studelska, Bethlehem, GA (US); Ren Wang, Milpitas, CA (US); Ievgeniia Gutenko, Port Jefferson, NY (US); Fang Ji, San Mateo, CA (US); Andrei Makhanov, San Jose, CA (US); Aditya Rane, Sunnyvale, CA (US); Jarad M. Fisher, Los Angeles, CA (US); Akila Suresh, San Jose, CA (US); Ashish C. Nagre, Sunnyvale, CA (US); Andrew Williams, Mountain View, CA (US); Victor Shugaev, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 16/828,929

(22) Filed: Mar. 24, 2020

(65) Prior Publication Data

US 2020/0300656 A1   Sep. 24, 2020

(51) Int. Cl.
*G01C 21/36* (2006.01)
*G01C 21/32* (2006.01)
*G01C 21/34* (2006.01)
*G06N 20/00* (2019.01)

(52) U.S. Cl.
CPC ......... *G01C 21/3679* (2013.01); *G01C 21/32* (2013.01); *G01C 21/3484* (2013.01); *G01C 21/362* (2013.01); *G06N 20/00* (2019.01)

(58) Field of Classification Search
CPC ............... G01C 21/3679; G01C 21/32; G01C 21/3484; G01C 21/362; G06N 20/00
See application file for complete search history.

(56) References Cited

U.S. PATENT DOCUMENTS

| | | | |
|---|---|---|---|
| 9,922,321 B2 * | 3/2018 | Aaron | G06Q 20/3572 |
| 10,242,019 B1 * | 3/2019 | Shan | G06F 40/30 |
| 2010/0106620 A1 * | 4/2010 | Marcus | G06Q 20/405 |
| | | | 705/26.1 |
| 2011/0044533 A1 * | 2/2011 | Cobb | G06V 20/52 |
| | | | 348/143 |
| 2015/0088704 A1 * | 3/2015 | Votaw | G06F 16/287 |
| | | | 705/30 |
| 2015/0345969 A1 * | 12/2015 | McGavran | G01C 21/3841 |
| | | | 701/532 |
| 2017/0006430 A1 * | 1/2017 | Chao | G01S 5/02524 |

(Continued)

*Primary Examiner* — Jess Whittington
(74) *Attorney, Agent, or Firm* — Kilpatrick Townsend & Stockton LLP

(57) ABSTRACT

The present technology improves points-of-interest (POIs) in applications by the gathering and use of data available from various sources to improve metadata of POIs in applications (e.g., map applications) or any other metadata or information that may be of interest to a user regarding any given POI. The present technology resolves transactions to POIs or Brands (in a map application, for example) and improves, updates, creates, and removes POIs/Brands. The present technology can also gain a clear name, granular and correct categorization, a URL, phone/chat contact info, etc. of the transactions.

17 Claims, 13 Drawing Sheets

(56) References Cited

U.S. PATENT DOCUMENTS

| | | | |
|---|---|---|---|
| 2018/0150658 A1* | 5/2018 | Franklin | G06K 7/087 |
| 2018/0315051 A1* | 11/2018 | Hurley | G06Q 20/3255 |
| 2019/0005107 A1* | 1/2019 | Carey | G06F 16/2282 |
| 2019/0098009 A1* | 3/2019 | Lee | H04L 9/321 |
| 2020/0065121 A1* | 2/2020 | Hart | G06F 9/4451 |
| 2020/0088534 A1* | 3/2020 | Nakirikanti | G01C 21/3461 |
| 2020/0364560 A1* | 11/2020 | Farivar | G06F 16/285 |
| 2021/0042724 A1* | 2/2021 | Rathod | G07G 1/0054 |
| 2022/0179665 A1* | 6/2022 | Rathod | G06F 9/451 |
| 2022/0260283 A1* | 8/2022 | Polk, Jr. | E21B 43/243 |

\* cited by examiner

SYSTEMS AND METHODS FOR RESOLVING POINTS OF INTEREST ON MAPS

CROSS-REFERENCE TO RELATED APPLICATIONS

This application claims the benefit of priority of U.S. Provisional Patent Application No. 62/822,921, filed on Mar. 24, 2019, the content of which is incorporated herein by reference.

TECHNICAL FIELD

The present technology pertains to electronic maps, and more specifically pertains to resolving ambiguities of points of interest (POI) and Brands of electronic maps based on a plurality of attributes (e.g., metadata).

BACKGROUND

Mobile devices have become popular among the general public because of their ability to run a wide variety of applications, including computing, location, communication, and entertainment. Mobile devices can determine their geographic location by a variety of methods (e.g., global position, triangulation, connected networks, etc.) and, as such, a user may be able to use the mobile device to determine his or her location. The location of the user can then be tracked on a map application. The map application can, not only show the current location of the user, but also display points-of-interest (e.g., restaurants, stores, businesses, etc.) and navigation thereto. Mobile devices can also now act as mobile payment devices by being linked to banks, credit cards, pre-paid cards, or the like. Mobile devices can then use communication technologies, for example, near-field communication (NFC), to complete transactions, for example, with brands of these points-of-interest.

A point-of-interest (POI) can include various metadata (e.g., name, category, hours, location, offerings, communication methods, reviews, ratings, etc.). The perceived value of any given POI is only as good as the associated metadata (or information about) that POI. Transaction and clearing data (of transactions), for example, associated with a mobile device can be utilized to resolve ambiguities with POI metadata (between POI metadata stored by an application and POI metadata collected or inferred from transactions) and provide improved map and wallet applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figures 1A, 1B:
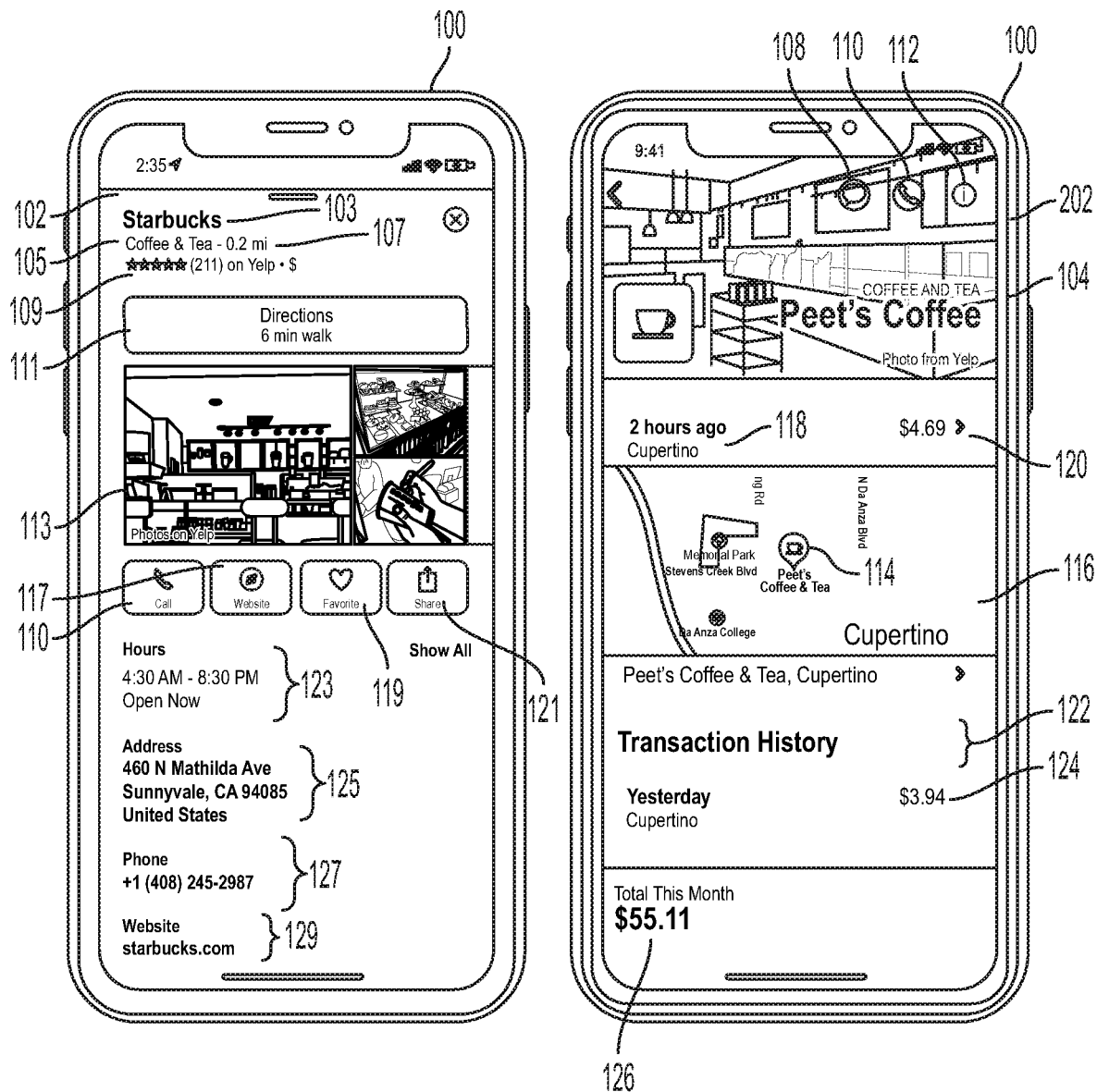
FIGS. 1A and 1B illustrate a graphical user interface of a POI.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for an improved map application, namely resolving ambiguities of POIs (or establishing new POIs) and/or Brands, for example, within an application running on a mobile device, web, in-app applications.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

As described above, one aspect of the present technology is the gathering and use of data available from various sources to improve metadata of POIs in map and wallet applications or any other metadata or information that may be of interest to a user regarding any given POI. There are at least two problems being solved by the systems, method and computer readable mediums disclosed herein: resolving transactions to POIs or Brands (in a map application, for example) and improving, updating, creating, and removing POIs/Brands. At the same time these problems are solved an application (wallet application, for example) can gain a clear name, granular and correct categorization, a URL, phone/chat contact info, etc. of the transactions. These problems are solved by associating the fragmented and noisy transaction data to POIs at high precision and recall rates, for example, over 90%. The association of this data can be built on the aggregating, clustering and machine learning models that can perform the association, as well as, the very granular and high quality understanding of POIs, Brands, and their attributes (such as category) and the relationships (sub-Brands, collocated partnerships, variations, etc.).

The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to personalize the map application and associated POIs based on, for example, transactional and clearing data associated with transactions performed by the user or associated with one or more user accounts. Accordingly, use of such personal information data enables the personalized and improvement of the map application and POIs within the map application. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A point-of-interest or POI is a specific point location that someone may find interesting or useful. For example, a POI could be a coffee shop, a shopping center, a gas station, a museum, a restaurant, a library, a school or university, a sports stadium, and or any other physical location that someone may want to visit. A Brand or Brand entity is a data model describing physical or virtual entities that can store attributes that pertain to a grouping of POIs (e.g., name, website, logo, category, app, phone number, etc.), virtual and/or app business representation. A Brand can be created based on, for example, vendor place data, POIs, place/location data using aggregation and machine learning models (e.g., Gradient Boosting Classifier), etc. A Brand can contain a global representation of the POIs with, for example, unique country specific attributes. A physical Brand can be applied to POIs enhancing and enriching their metadata, providing uniformity of their metadata attributes for POIs tagged with a specific brand name (e.g., Peet's, Starbucks, Bloomingdales, Safeway, etc.). A Brand can be applied to a POI using a machine learning model (e.g., Random Forest, neural network, etc.) or in small number of instances using human curation. A virtual Brand can be an entity that represents a POI that may not necessarily be associated with a constant location (e.g., taxi, transit agency, online store, app, food truck, pop-up store, etc.). Brands can serve as fallback mechanisms for transaction that cannot be associated with a specific POI, either due to lack of information about location of the transaction or mobile device, or based, in-app, or web-purchases for entities that do not have physical merchant locations. Regardless of the location of a transaction (e.g., in a physical store, in-app, VPAN, on-the-web, etc.), the Brand can be used to aggregate transactions on a mobile device (or linked account) for serving as single point of interaction with a business and related sub-businesses. Similarly, to a POI, a Brand can enable the mobile device (linked account and/or applications) to track the amount of money spent at a given Brand or sub-Brand, track returns, and interactions with brand representatives.

Now turning to FIGS. 1A and 1B, which illustrate a graphical user interface illustrating a POI in a maps application and a wallet application, respectively. Mobile device 100 can run map application 102 and a wallet application 202. In some examples, the map application and wallet application can be integrated and/or share data. The applications can be downloaded from, for example, an app store and/or the Internet. The applications, can each run on mobile device 100, can connect to one or more application servers (e.g., remote servers, cloud based, databases, indices, etc.) which store information (e.g., metadata) related to the applications, including, but not limited to: POIs, Brands, metadata of POIs, metadata of Brands, account information, traffic information, navigation information, transaction information, etc. Map application 102 can include a variety of different screens and views, including, but not limited to, a map view (e.g., showing multiple POIs on the map application), navigational view (e.g., navigating to a particular POI), a search view (e.g., listing of POIs), or as shown here, a detailed POI view. Wallet application 202 can include a variety of different screens and views, including but not limited to, transaction view, account view, map view, or as shown here, a detailed POI view. In other examples, map application 102 can be a wallet application (e.g., 202) with an integrated map feature. Wallet application 202 can show a detailed view of POI 104 (e.g., Peet's Coffee). POI 104 can be selected from a map view, search view, or a transaction view (e.g., from wallet application 202). The detailed POI view can show metadata of the selected POI 104, including but not limited to, chat 108, call 110, additional information 112, location 114 on map 116, transaction history 122, transaction(s) 124, and total transaction amount 126. The detailed POI view can be accessed, for example, by selecting a specific transaction from a transaction view (which lists transactions, for example, over a specific time period). Additional information 112 can include hours of operation, reviews, ratings, photographs, etc. In some examples, the additional information can be verified. For example, the wallet application can verify that a transaction took place at the POI, since the wallet application has access to the transaction data. The verification that the transaction took place, can be used to verify that the review and/or ratings are based on an actual transaction at that POI (and not a "fake review").

Chat 108, when selected, can launch a business chat application (e.g., separate application or within map application 102 or wallet application 202) to live chat with a representative of POI 104 (via a computing device). For example, chat 108 can be launched via one or more application programming interfaces (API). In some examples, the chat can be instant messages, text messages (short message service), iMessages, etc. In some examples, the chat can also transmit, to the POI, a selected or threshold number of transaction(s) (e.g., 120) associated with the account on the mobile device 100. When transmitted the chat can enable discussion of the transmitted transaction(s) with the representative of POI 104. Call 110, when selected, can launch a call application (e.g., separate or within map application 102 or wallet application 202) for an audio and/or audio/video call with a representative of POI (e.g., 103, 104). In some examples, the call can also transmit a selected or threshold number of transaction(s) (e.g., 120) associated with the account on the mobile device 100. When transmitted the call can enable discussion of the transmitted transaction(s) with the representative of POI 104. In both instances, the transmitted transaction(s) can be performed via encrypted communication.

Map 116 can display location 114 of POI 104 (e.g., the location of the last POI to which a transaction took place). In some instances, similar POIs can also be disclosed in map 116 (e.g., other Peet's locations, Starbucks, competing coffee shops, etc.). Map 116 can also display the current location of mobile device 100, for example, when the mobile device is within a predetermine threshold of POI 114. Map 116 can also display the timing of the most recent transaction 118 and the last transaction amount 120 (with the POI) associated with the account on the mobile device 100 (or the last time mobile device 100 was within a predetermined threshold of POI 114).

Transaction history 122 can display recent transactions 124 and total transactions 126 in a predetermined period (e.g., week, month, year, etc.). The maps application and/or wallet application can be configured (e.g., by the user, predetermined, etc.) to provide an alert and/or notification when the total transactions in the predetermined period exceeds a threshold amount. In some instances, no transactions have been associated with POI 104 (and mobile device 100) and there will be no transaction history. In other instances, a subset of the total recent transactions can be displayed (e.g., based on available viewable space of map application 102 or wallet application 202). The subset and/or transactions outside the subset can be viewed in a separate window, for example, by selecting transactions history 122.

Map application 102 can show detailed view of a POI (e.g. 103), for example, Starbucks. Metadata of the POI can be displayed, for example, but not limited to: category 105, distance from current location (of mobile device) 107, ratings 109, directions 111, photographs 113, call 110 (as described above), website (e.g., 117, 129), favorite 119, share 121, hours of operation 123, address 125, and phone number 127.

Figure 2:
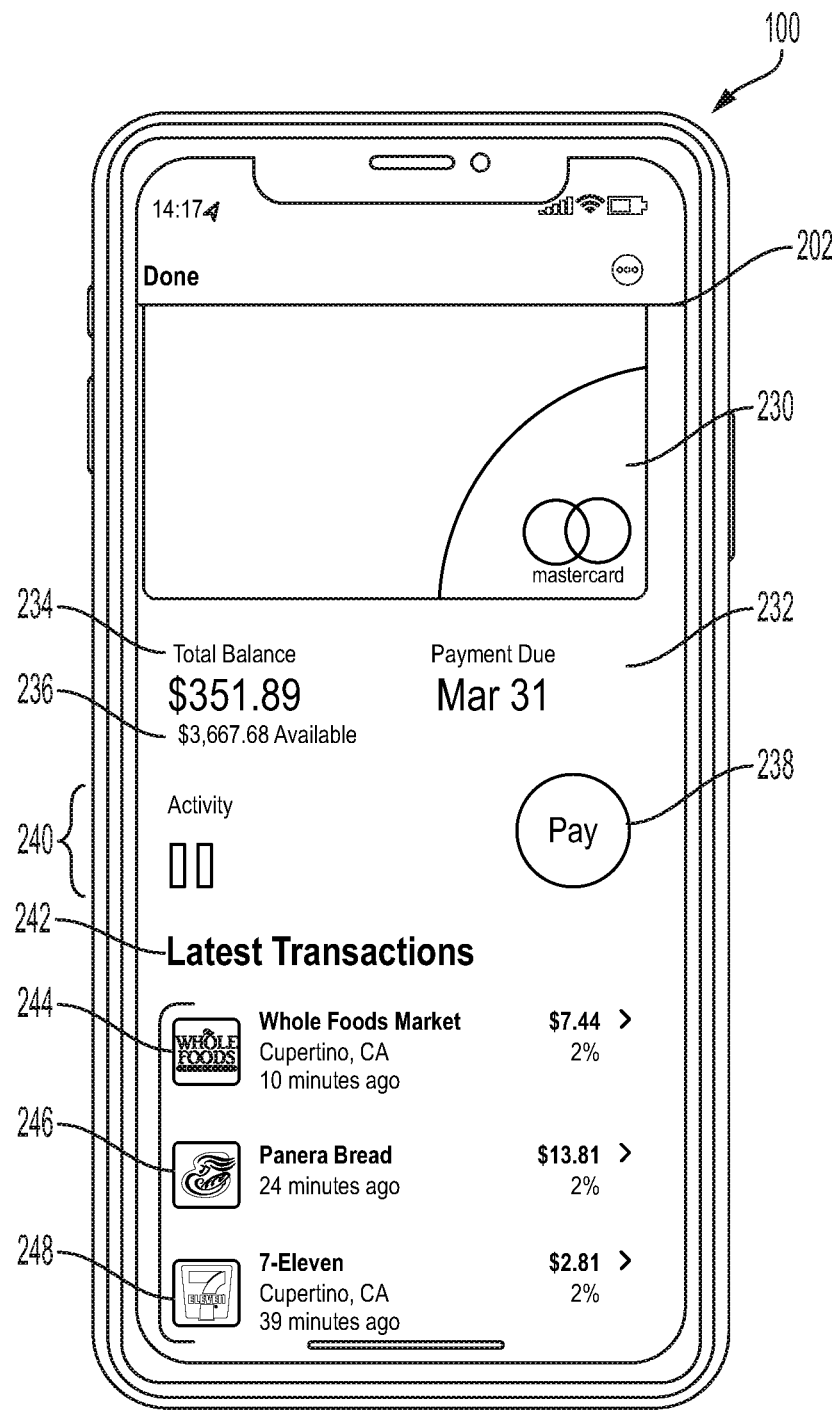
FIG. 2 illustrates a graphical user interface of a wallet application.

Now turning to FIG. 2, which illustrates wallet application 202. In some instances, wallet application 202 can be integrated with and/or share information with map application 102. The wallet application, running on mobile device 100, can connect to one or more application servers (e.g., remote servers, cloud based, databases, indices, etc.) which store information (e.g., metadata, etc.) related to the wallet application. Wallet application 202 can be linked to one or more banks, credit cards, pre-paid cards, etc. In this example, wallet application 202 is linked with credit card 230. Wallet application 202 can display a total balance 234 and payment due date 232 of credit card 230. Wallet application 202 can also include payment option 238. For example, payment option 238 can be linked with a financial institution for facilitating payment of total balance 234 or alternatively, another amount. Wallet application 202 can also include activity monitor 240. Activity monitor 240 can be a graphical summary of daily charges for the linked account (e.g., credit card 230). Wallet application 202 can also include latest transactions 242. Latest transactions 242 can include one or more transactions 244, 246, 248. The transactions (e.g., 244, 246, 248) can be transactions with linked credit card 230 and associated with an account of mobile device 100. The one or more transactions can include transaction metadata, for example, POI/Brand, time of transaction and amount of transaction. Latest transactions 242 can be determined based on a threshold, for example, last five transactions, transactions within last hour, etc. In some instances, there are no latest transactions and no transactions are displayed. The wallet application 202 can prepare, or the application server associated with the wallet application 202 can prepare transaction statement(s) and associated POI or Brands. The transaction statement can be transactions that occurred during a specified time period.

Figure 3:
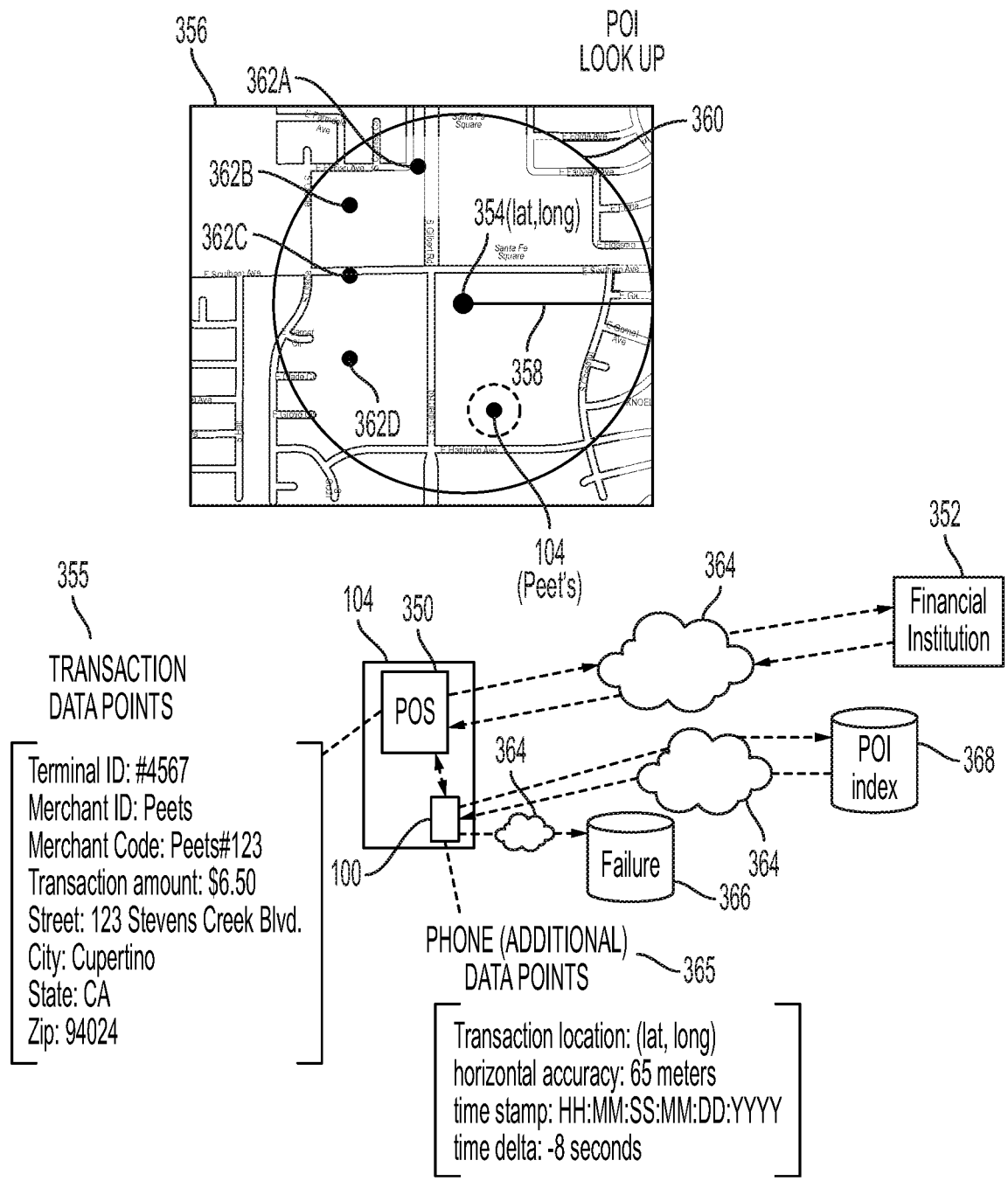
FIG. 3 illustrates determining a POI based on transactional and location data of an associated mobile device.

Now turning to FIG. 3, which illustrates associating transactions and transaction metadata with application(s) (e.g., 102, 202) of mobile device 100. As previously discussed, map application 102 and wallet application 202 can be integrated or share information (e.g., transaction data, clearing data, etc.). The integration and/or sharing of information enables this information to be utilized in updating (or creating new) POIs or Brands (e.g., metadata of POIs/Brands) as described below.

During a transaction at a POI or Brand, transaction data (e.g., metadata associated with the transaction) can be received, for example, transactional data points 355 are recorded that relate to the transaction. In a typical transaction, transaction amount, Merchant ID and Merchant name are three such transactional data points that are utilized during, for example, a physical swipe of a credit card. These transactional data points are transmitted over a network(s) 364 between the point-of-sale (POS) terminal 350 at a POI 104 and a financial institution 352. Network(s) 364 can be any network capable of transmitting data between two points (e.g., Internet, telephony, cellular, LTE, 4G, 5G, etc.).

In transactions where a credit card is linked with a mobile device (e.g., 100), additional metadata can be collected, for example, phone data points 365 from the mobile device. Phone data points can include, but are not limited to: transaction location (latitude, longitude), horizontal accuracy (e.g., how accurate the mobile device believes the location is), timestamp, and time delta (e.g., time between transaction and location information provided). These phone data points can be used to determine an exact location that the transaction is taking place and, as such, determine phone data points related to the POI or Brand (where the transaction is taking place). One or more of and/or one or more combinations of the transaction data points and phone data points can be used to determine the POI via look-up index 368. A failed look-up can be written in a failure index 366 (e.g., for use in offline resolution of the transaction via, for example, machine learning, etc.). In some examples, the failed look-up can be retried (e.g., at set interval, predetermined time, etc.). For example, the environment (for which the look-up occurs) is always improving. Retrying a failed lookup at some period forward could provide a successful look-up. In some instances, the resolving can be performed offline, for example, for updating the map application and/or wallet application, as described below.

For example, as shown in FIG. 3, a transaction can be initiated from POS 350 at POI 104. In this instance, the transaction can be an NFC transaction with credit card 230 stored in wallet application 202 on mobile device 100. In other instances, transactions can include, but are not limited in to: in-application transactions (barcode, mobile order, etc.), on-the-web transactions, virtual primary account number (VPAN), or physical card swipe transactions (e.g., magnetic strip, chip, or in-card NFC). In instances where the mobile device is not in the location of the POI/Brand during a transaction (e.g., in-application, on-the-web, etc.), the POI/Brand can still be still be resolved using transaction data points (e.g., merchant ID/name, address, zip, city, etc.) and POI Index 368. For example, the POI/Brand can be resolved (e.g., Peets coffee) in a specific location. In some examples, in-application orders can have specific identifiers associated with the specific application. For example, Peet's mobile application can have an identifier so that all transactions placed from the mobile application will have the identifier as a data point of the transaction.

When the NFC transaction is initiated from mobile device 100, POS 350 can transmit the transaction and metadata to financial institute 352. Financial institute 352 can then send back an approval or denial of the transaction, which is then sent (with data points) from POS 350 to wallet application 202 on mobile device 100. The financial institution can also send an approval/denial of the transaction and associated metadata to wallet application 202 (e.g., via the account on the mobile device). At the time of the transaction, the operating system of mobile device 100 can also determine and send to wallet application 202, phone data points including, but not limited to: the current location of the mobile device 102 (i.e., transaction location), horizontal accuracy (i.e., range), timestamp and time delta. These phone data points can be used to resolve the location of the merchant to which the transaction took place. These phone data points are needed because the transaction data points, in some instances, do not provide enough information to fully resolve where the transaction took place. For example, the merchant name (e.g., PEETS) and merchant ID (e.g., PEETS #123) may not provide enough information to determine the location of the transaction. In some instances, a credit card statement can show a business and an address, however, this information does not always provide insight into the transaction. For example, a company with a different name (e.g., Coffee Shop Payments, LLC) could be setup to run transactions for POI (e.g., Peet's Coffee Shop) and as such, resolving the POI could prove difficult. In some examples, the address could be the corporate address for the POI, not where the transaction took place. In other examples, the address could be the same for several POIs (e.g., multiple shops in a shopping center, food court, etc.).

As shown in FIG. 3, the phone data points can be utilized to determine the POI where the transaction took place. The transaction location 354 (lat, long) of mobile device 102 can be shown on map 356. In some examples, the horizontal accuracy 358 (e.g., 65 meters) can then be used to determine an approximate location of the transaction (with the lat, long). A geo-hash or geofence 360 can then be generated around transaction location 354. In some examples, the geofence can be of a threshold radius, e.g., 5 kilometers. In other examples, the horizontal accuracy can be used as the radius for the geo-hash. The geofence can establish a "minimal region" in which the transaction can be resolved to a POI. In some instances, there is also a "maximum distance" a POI might be from the transaction. For example, when there are no similar POIs for a transaction within a geofence, the "maximum distance" can be utilized to resolve the POI. The mobile device can determine its location based on various signals (e.g., satellite, cellular towers by triangulation, WIFI router signals and density, etc.). Each of these signals has varying levels of precision. The mobile device (and/or computing device that receives the data) can calculate the probable error (e.g., level of precision) in the location latitude and longitude. The horizontal accuracy can be this calculated error (e.g., location received from the satellite signals can have an error of 65 meters, etc.). Using current POIs known to the map application, the POIs (e.g., 362A-D, 104) can be shown in within the geofence. In other instances, POIs within the geofence can be retried from the POI Index 368. The merchant name and/or merchant ID (e.g., PEETS, PEETS #123) can then be used to determine if a Peet's coffee shop is located within the geofence 360. When a Peet's is located within the geofence 360, the transaction can be resolved to that location and map application 102 and/or wallet application 202 can be updated with the corresponding data points. The phone data points (e.g., timestamp and time delta) can be used to further resolve POI, for example, by more accurately determining the location of the mobile device. For example, the time delta can be the amount of time between the transaction and the location. Accordingly, the time delta, timestamp and current location can be used to provide a more definitive area of the transaction location. In other examples, transaction amount can also be used to resolve a POI, for example, pharmacy transaction amounts generally end is whole dollars. As such, the transaction amount can aid in resolving POI by narrowing type or category of POI to which processed the transaction. In other examples, metadata (e.g., Brand information, categories, etc.) can be used to resolve a POI (or Brand), for example, merchant name (e.g., resolution of contactless and physical transactions), online merchant names (e.g., resolution of on-the-web transactions) and Adam_ID (e.g., resolution of In-App transactions).

In some instances, a physical card swipe might take place (to a linked card) and/or the mobile device might not be present for the transaction. In these examples, the phone data points can still be collected (e.g., transaction location, horizontal accuracy, etc.) however, these phone data points can be discarded and not used to resolve the POI since the POI would likely not be within the geofence. While the phone data points will not be used in resolving the POI, the POI can still be resolved by transactions from other mobile devices (e.g., with the same merchant ID or merchant name), as described below. In other instances, when a POI is not within the geofence a fraud alert can be sent to the device.

While the disclosed embodiment recites the resolution of POI is performed on the mobile device, in other embodiments, as described below, the transactional data points and phone data points (of multiple transactions) can be transmitted to an off-site environment for processing (e.g., machine learning environment, cloud computing environment, etc.).

Figure 4:
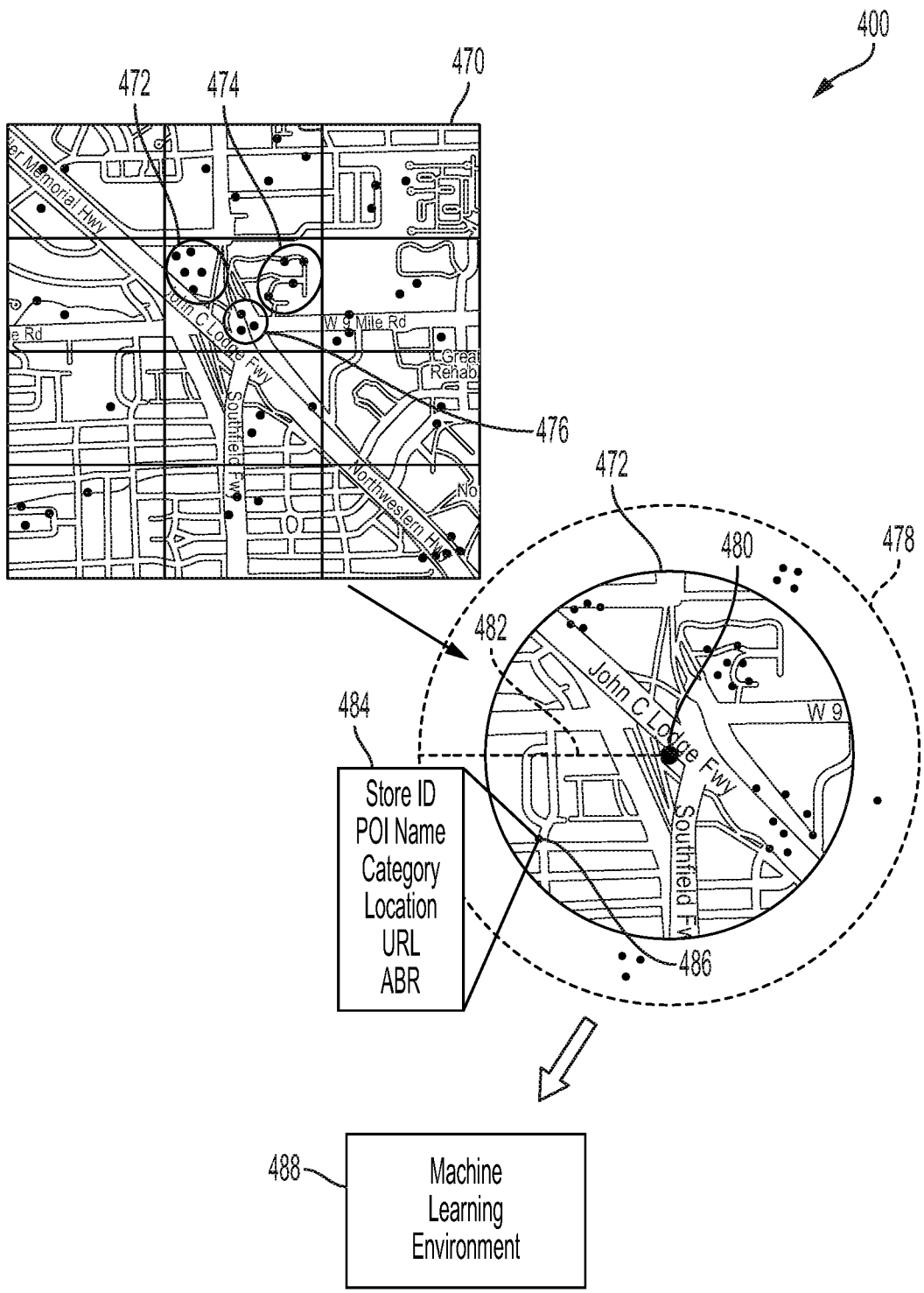
FIG. 4 illustrates a clustering model for a plurality of POIs.

Turning now to FIG. 4, which illustrates an off-site environment 400 for processing a plurality of data points (e.g., transaction and phone). In some examples, the off-site environment can be a machine learning environment (e.g., random forest, polynomial logistic regression, neural network, etc.). For example, a random forest model can be used to match a transaction (or group of transactions) to potential POIs (or Brands). In other examples, polynomial logistic regression can be used to match a transaction (or group of transactions) to potential POIs (or Brands). This machine learning environment can include similarity features between, but not limited to: merchant name and POI/Brand name, merchant URL and POI/Brand URL, POI store IDs, POI and Brands, transaction and POI categories, etc. The model can also include distance between transactions and potential POI/Brands, country codes, and/or ranking scores for name similarity and distance as features. The model can be trained using labels. For example, model(s) can be trained using a variety of combinations of input and labels (e.g., transaction data and matching POI). In some examples, a model can be trained for specific transaction types (e.g., mobile payments or card payment). Techniques such as feature selection and hyper-parameter tuning can be used to improve the machine learning performance. In other examples, a deep learning and neural networks can be used to match a transaction to potential POIs (or Brands).

The off-site environment can be populated with a specified period of transactions (e.g., data points), for example, 90 days, etc. The data points can be broken up to geo-hashes 470 (e.g., based on location). The geo-hashes can be, for example, broken up into quadrants. The quadrants can be of varying size and granularity, for example, a quadrant can be an entire metro area (e.g., San Francisco), it can be a neighborhood of a metro area (e.g., Pacific Heights, Tenderloin, Inner Sunset, etc.), and/or it can be specific distances (e.g., square mile, etc.). The data points, in the geo-hashes, can then be clustered, for example, based on proximity to each other and/or similar (e.g., matching, etc.) transaction data (e.g., cluster 472, cluster 474, cluster 476). For example, transactions with different metadata will be put into different clusters (even if in close proximity). The clustering can be single layered or multi-layered. The clustering can be based on a first threshold distance (e.g., distance between the transactions). The clustering can be further based on a second threshold distance (e.g., distance between the transactions). For example, the first clustering threshold distance can be 25 meters and the second clustering threshold distance can be 3 meters. In some instances, the multi-layered can be used to differentiate transactions between similar POI within a close distance to one another. For example, in a situation where there is a first Peet's coffee shop on one side of the road and a second Peet's coffee shop on the other side of the road, the second clustering threshold distance (e.g., 3 meters) can be utilized to ensure the transactions are clustered to the Peet's coffee shop where the transaction actually occurred. In other instances, all transactions in a quadrant of the geo-hash (regardless of the horizontal accuracy or age of the transaction) can be clustered together.

Once the clusters have been created from the geo-hash, the clusters (e.g., 472, 474, 476, etc.) can be compared with POIs and formatted for input to machine learning environment 486. In this example, cluster 472 will be used as demonstrative, however, this is not limiting and merely an example for illustration. A center point 480 of the cluster 472 can first be determined. The center point can be a cluster representative of the cluster (e.g., representative transaction, to which other transactions are similarly measured). The center point can be based on location, for example, the median location of the transactions within the cluster. In other examples, the center point can be the transaction with a horizontal accuracy lower than a horizontal accuracy threshold and age of the transaction lower than an age threshold. A radius 482 can be used to determine a subset of POIs within the circle 478. That is, instead of using every POI within the geo-hash (or geo-hash quadrant) for resolving the transaction, a subset can be determined. The radius can be a threshold distance, for example, 280 meters. The subset of POIs in circle 478 can be used to match with the transactions, in order to resolve the transaction. For example, each POI (e.g., 486) can have metadata (e.g., Store ID, POI Name, Category, Location, URL, ABR, etc.). To resolve the transaction, the metadata of each POI can be compared with the transaction data (e.g., metadata, data points, etc.) of the transaction. In some instances, there may be hundreds of ways to compare the data points between the transaction and the POIs, their associated Brands, and the relationships between POIs in close proximity. These comparisons become features that can be passed to a machine learning model (e.g., 488). The transaction data from the matched transaction cluster can then be stored in the POI metadata for use by an online transaction resolution system (e.g., method 500, etc.) for future transactions.

Along with determining the POI where the transaction took place, ambiguities can also be resolved. The match (if one occurs), the values of the transactions and POI (e.g., metadata values, data points, etc.) can be used as input into the machine learning system (e.g., for verification and/or learning). For example, when the machine learning environment is trained, the input can be used for verifying and resolving ambiguities in a POI (via the transaction data points and phone data points). In one non-limiting example, when there are transactions that happen before 8:00 AM and the hours of operations for a POI say it opens at 8:00 AM, the POI metadata (in the map application) can be updated to reflect an earlier opening time (e.g., 7:00 AM). In other non-limiting examples, metadata of POIs (e.g., season businesses) can be updated as closed (e.g., when transactions cease) and automatically re-opened (e.g., when transactions start).

Resolving ambiguities can be performed in a variety of ways. Resolving the ambiguities will aid in having accurate information related to the POI(s) (e.g., correct metadata) and aid in matching transactions with the correct POI (e.g., where the transaction took place). In some instances, ambiguities can be resolved through location information, POI metadata, transaction data, Brand data, category data, or combinations thereof.

In some other instances, ambiguities can be more difficult to resolve, for example, where the transaction takes place at a store inside a store (e.g., a Starbucks inside a Target). In these "store inside a store" instances, ambiguities arise because the transaction data, generally, will show the transaction is from the "store" (e.g., Target), even if the transaction actually takes place at the "store inside" (e.g., Starbucks). The location information, regardless of its availability, will not help resolve this type of ambiguity. These types of ambiguities can be resolved by using, for example, the "TerminalID" field of the transaction data (e.g., metadata). The TerminalID can include numeric or alphanumeric sequence that is tied to the hardware that processed the transaction. For example, the TerminalID that processed the "store inside" (e.g., Starbucks) will not be used for "store" (e.g., Target) transactions. When a TerminalID is known for the "store inside" and the "store" these ambiguities can be resolved. In some instances, the TerminalID can be determined based on aggregating/clustering transactions. For example, by aggregating/clustering all the transactions over a period of time, an analysis can be performed on the associated metadata to determine which TerminalIDs belongs to which store. In some examples, hours of operation, amount paid, frequency of transactions, etc. can be used to determine if a TerminalID belongs to the "store inside" or the "store".

Another example ambiguity to resolve is a restaurant that also has a food truck. In this example, the avoidance of creating an ambiguity is warranted. For example, transactions at the food truck would not want to be resolved to the restaurant. In these situations, location information (e.g., lat/long, zip code, etc.) can be used to differentiate between the food truck and the restaurant. In situations where the location information is not available (e.g., mobile device has locations services off), transaction data can be used to approximate the location (e.g., CANL, zip code, etc.), as illustrated below. In other instances, a TerminalID can be utilized (e.g., when the TerminalID is different between the food truck and the restaurant).

Figure 5:
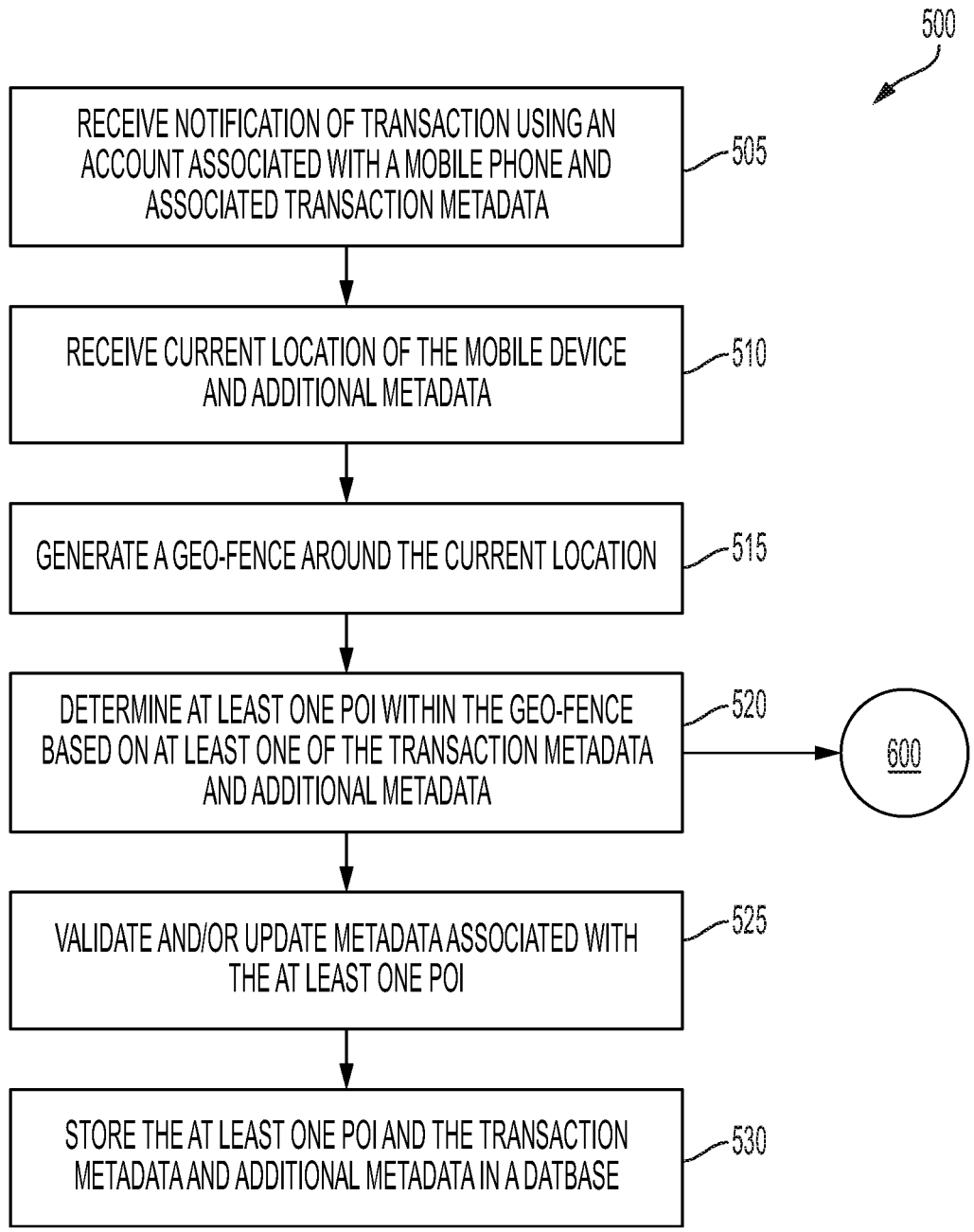
FIG. 5 illustrates an example method for online resolving ambiguities of a POI.

FIG. 5 illustrates an example method 500 for online resolving ambiguities in a POI. The method illustrated in FIG. 5 is provided by way of example, as there are a variety of ways to carry out the method. Additionally, while the example method is illustrated with a particular order of blocks, those of ordinary skill in the art will appreciate that FIG. 5 and the blocks illustrated therein can be executed in any order that accomplishes the technical advantages of the present disclosure and can include fewer or more blocks than illustrated.

Method 500 can begin at block 505. At block 505, a computing device, can receive a notification of a transaction using an account associated with a mobile device and transaction data (e.g., metadata associated with the transaction). The computing device can be a server, cloud-based system, etc. The transaction can be via the mobile device, for example, NFC, an application (e.g., wallet application, etc.). The transaction can also be a physical swipe of a credit card, bank card, etc. The transaction data or transaction metadata can include, but is not limited to, the transaction data points 355 and/or phone data points 365.

At block 510, the computing device, can receive a current location of the mobile device and additional metadata (e.g., 365). In some examples, the computing device can first request the current location (before it is received). In other examples, an application (e.g., maps, wallet, etc.) can store the current location and additional metadata after a transaction has been completed (e.g., confirmation received from financial institution) and transmit the information upon request. The current location can be the location of the mobile device at the time location data is sent from the mobile device to the computing device. The location of the mobile device at the time of the transaction can be extrapolated based on the current location and the additional metadata (e.g., timestamp, time delta, etc.). In some examples, the additional metadata is not required for determining the location of the mobile device at the time of the transaction.

At block 515, the computing device can generate a geo-hash/geofence around the current location. In some instances, the geofence can be generated around an estimate location of the transaction (e.g., extrapolated from the additional metadata). The size of the geofence can be generated based on a threshold value, as described above.

At block 520, the computing device can determine at least one POI within the geofence. For example, the at least one POI within the geofence (of know POIs in, for example, POI index) can be based on similarities/matches between the transaction metadata and metadata of the at least one POI. For example, if the transaction metadata has a Merchant ID equal to "PEETS #123" than any POI within the geofence with metadata "PEETS #123" can be a matched POI. In other examples, more than one item of metadata can be used to reduce the number of POIs that are determined (e.g., for more defined accuracy). In other examples, metadata fields like merchant name, merchantCANL (e.g., raw transaction string from the merchant, including, but not limited to merchant name, merchant ID, address), Adam_ID/appId (e.g., identifies an inapp transaction), and online merchant metadata (e.g., URL, domain to identify online merchants, etc.) can be used to determine at least one POI. When, for example, multiple POIs (e.g., Brands) are identified in the geofence, the ambiguities can be resolved by using additional metadata fields (e.g., zip code, merchant category, etc.) and/or relationships between multiple POI or Brands. In some examples, when a POI cannot be determined in the geofence, a maximum distance can be used to find a match outside the geofence, as described above. In some examples, a POI might not be able to be determined and the metadata and transaction can be stored in a database (e.g., failure index 366) and sent to, for example, an offline process and/or machine learning environment (method 600).

At block 525, the at least one POI can be validated and/or updated. In some instances, differences can be determined between the transaction metadata and the at least one POI. In some examples, multiple transactions over a period of time can be used to update metadata of the POI. In one non-limiting example, if the transaction took place at 7:15 AM (as shown in the transaction metadata) and the operating hours start at 8:00 AM (as shown in the POI metadata), the POI metadata can be updated to, for example, a 7:00 AM opening time. In some instances, the differences can be determined based on a plurality of transactions over a period of time (e.g., 90 days, etc.) as shown in method 600.

At block 530, the at least one POI and the transaction, transaction metadata and additional metadata can be stored in a database. For example, POI index 368 and/or failure index 366.

Figure 6:
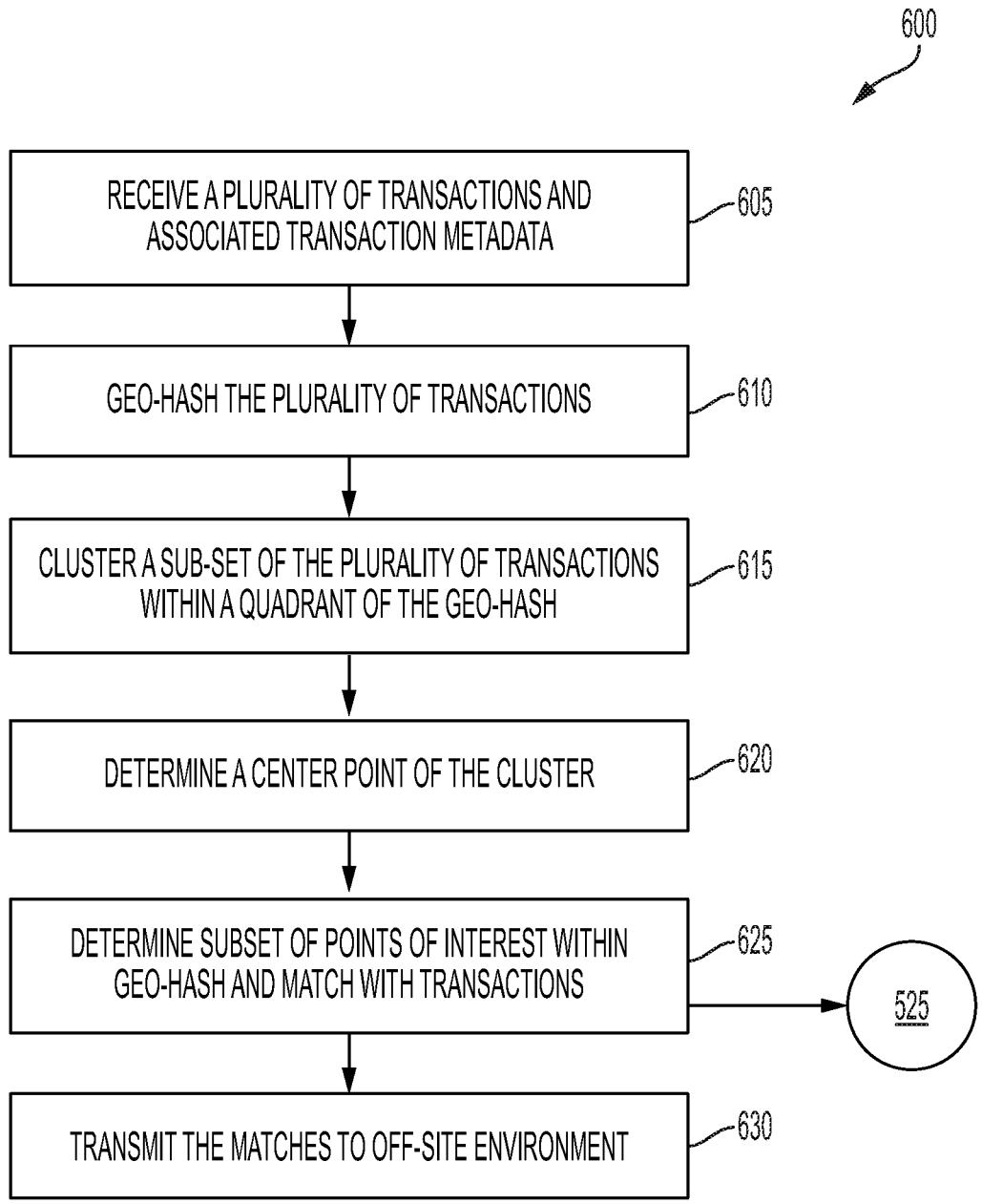
FIG. 6 illustrates an example method for validating/verifying resolved ambiguities of a POI.

FIG. 6 illustrates an example method 600 for offline resolving ambiguities in a POI. The method illustrated in FIG. 6 is provided by way of example, as there are a variety of ways to carry out the method. Additionally, while the example method is illustrated with a particular order of blocks, those of ordinary skill in the art will appreciate that FIG. 6 and the blocks illustrated therein can be executed in any order that accomplishes the technical advantages of the present disclosure and can include fewer or more blocks than illustrated.

Method 600 can begin at block 605. At block 605, a computing system can receive a plurality of transaction metadata (including, for example, data from block 520 of method 500). The transaction metadata can include, but in not limited to transaction data points 355 and phone data points 365. In some examples, POI(s) that have been previously determined (as shown in, for example, method 500) from the transaction and metadata can also be received. In some examples, the transaction metadata can be for a predetermined period of time.

At block 610, the plurality of transactions can be geo-hashed. That is, based on locations of the transactions (e.g., the current location and/or extrapolated location) the plurality of transactions can be segmented into quadrants (e.g., geohashed) as shown, for example, in FIG. 3.

At block 615, a subset of the plurality of transactions within a quadrant of the geo-hash can be clustered. The clustering can be performed based one or more threshold distances (e.g., between the transactions), as described above.

At block 620, a center point of the cluster can be determined. In one example, the center point can be based on a median location within the cluster. At block 625, a subset of POIs (within the geo-hash) can be determined. The subset of POIs can be used to resolve the transaction. That is, metadata of the POI can be compared with the metadata of the transaction. When a threshold number of similar metadata is satisfied, the transaction and POI can be used as input into machine learning environment. When the threshold number of similar metadata is not satisfied, the transaction will not be used. For example, the threshold number can be equal values of two metadata fields. In a non-limiting example, when the center point has a Merchant Name of "PEETS" and a Merchant ID of "PEETS #123" and the transaction has a Merchant Name of "PEETS" and a Merchant ID of "PEETS #123", than the transaction can used as input, while a Merchant Name of "PEETS" and a Merchant ID of "PEETS #345" will not be used. In some examples, a machine learning can be utilized to determine matches between the transaction data and the POIs within the geo-hash.

In some instances, when a match occurs and the transaction data was received from method 500, the match and POI metadata can be transmitted to block 525 of method 500.

At block 630, the transaction and POI (and associated transaction metadata and phone metadata) can be transmitted to an off-site environment (e.g., machine learning environment). The transmitted information can be used to train the off-site environment and/or resolve ambiguities with the POI, as described above. In other examples, the transaction, POI and the associated metadata can be used to validate/update the metadata associated with the at least one POI. In some examples, there can be multiple transactions related to the POI, these multiple transactions will then have the most recent, accurate information regarding the metadata of the POI. Any ambiguities between the metadata of the POI and the metadata of transactions can be resolved by updating the metadata of the POI to correspond with that of the transactions, for example, on map application 102 and/or wallet application 202.

FIGS. 7A-F are flow charts of example methods of matching transactions with POIs. The methods illustrated in FIGS. 7A-F are provided by way of example, as there are a variety of ways to carry out the methods. Additionally, while the example methods are illustrated with a particular order of blocks, those of ordinary skill in the art will appreciate that FIGS. 7A-F and the blocks illustrated therein can be executed in any order that accomplishes the technical advantages of the present disclosure and can include fewer or more blocks than illustrated.

Figure 7A:
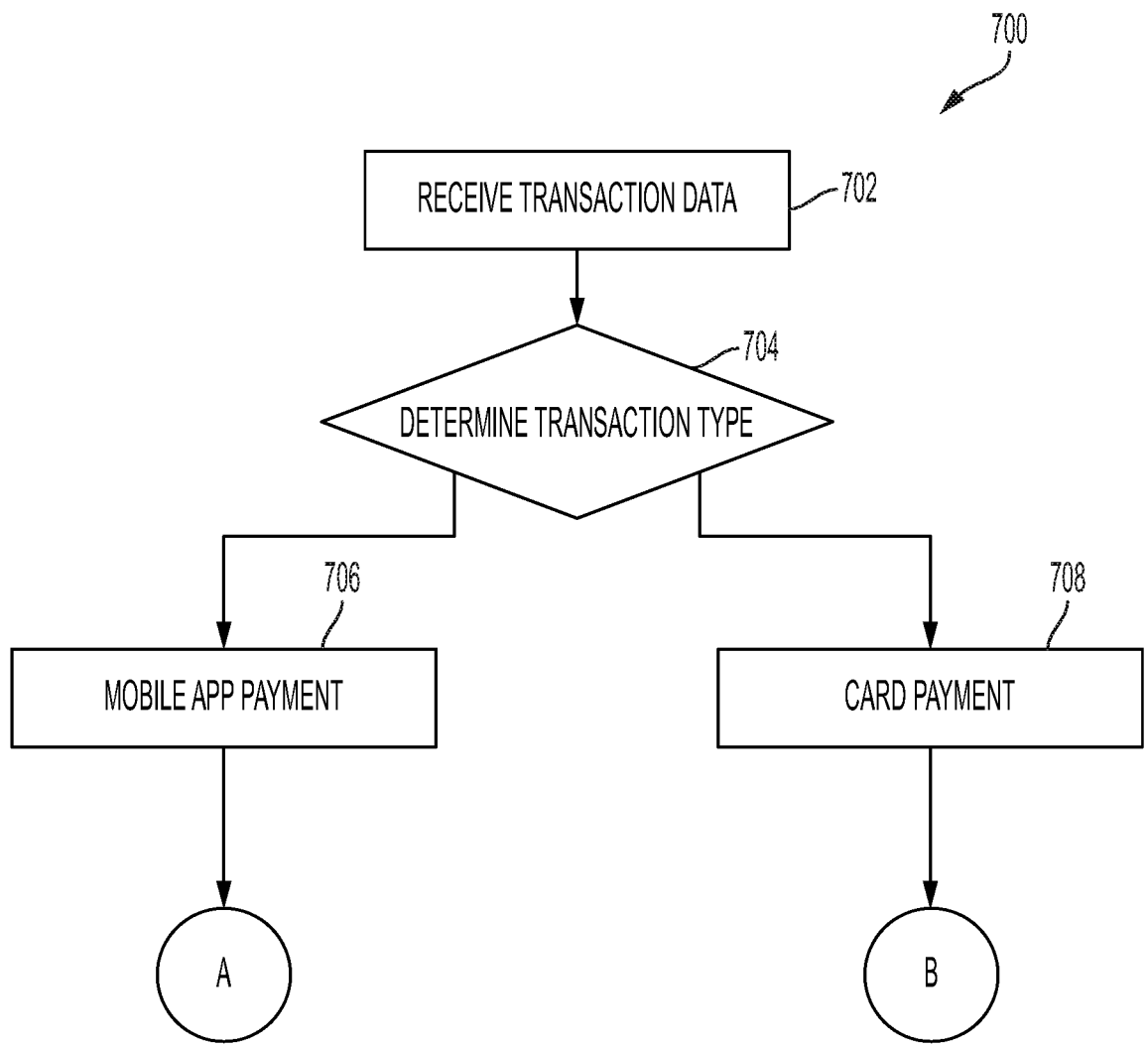
FIGS. 7A-7F illustrate example methods for matching transactions with a POI.

Method 700 can begin at block 702 of FIG. 7A. At block 702, transaction data (e.g., metadata associated with the transaction, etc.) can be received. For example, a computing device, can receive transaction data, for example, a notification of a transaction using an account associated with a mobile device and associated transaction metadata. The computing device can be a server, cloud-based system, etc. The transaction can be via the mobile device, for example, NFC, barcode, an application (e.g., wallet application, etc.), etc. The transaction can also be a physical swipe of a credit card, bank card, etc. The transaction data can include, but is not limited to, the transaction data points 355 and/or phone data points 365.

At block 704, a transaction type can be determined. For example, the computing device can determine if the transaction was via a mobile device or via a physical swipe of a card. The transaction type can be determined from the associated metadata. In some examples, the transaction type can be determined based on specific fields and values in the associated metadata (e.g., MCC category, etc.). In other examples, the transaction type can be determined based on a combination of different fields and values.

Figure 7B:
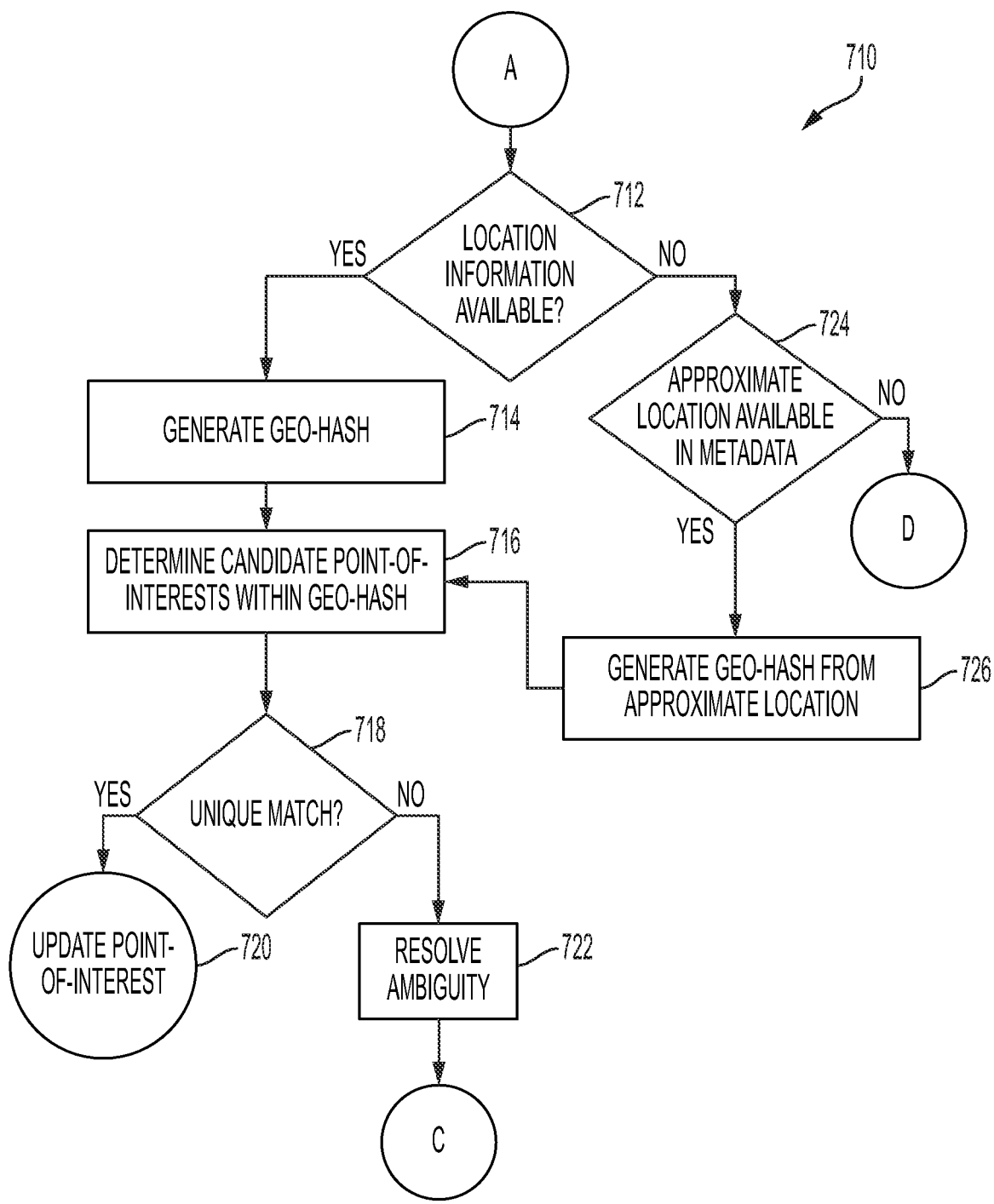

At block 706, it is determined that the transaction type is a mobile device payment and method 700 can proceed to method 710 of FIG. 7B. At block 708, it is determined that the transaction type of a card swipe payment and method 700 can proceed to method 730 of FIG. 7C.

Method 710 of FIG. 7B can continue from block 706 from method 700 of FIG. 7A. At block 712, a determine is made as to whether location information is available. For example, the computing device can determine if location information (e.g., lat/long) was received with the transaction data. In some examples, an application from the mobile device (e.g., maps, wallet, etc.) can store the location information of the mobile device (e.g., at the time of the transaction). The location information from the transaction can then be transmitted at any time after the completion of the transaction. In some examples, the current location can be the location of the mobile device at the time it is sent from the mobile device to the computing device. The location of the mobile device at the time of the transaction can be extrapolated based on the current location and the additional metadata (e.g., timestamp, time delta, etc.).

At block 714, a geo-hash can be generated based on the location information. For example, the geo-hash (or geofence) can be generated around the location information of the transaction. In other examples, the location can be extrapolated from the additional metadata. The size and shape of the geofence can be generated based on a threshold value, as described above.

At block 716, candidate POI(s) within the geo-hash can be determined. In some examples, the candidate POI(s) can be all known POI(s) within the geo-hash. In some examples, a plurality of POI(s) (and their known locations) can be retrieved from a database, index, etc. (e.g., POI index) which can be accessed to determine POI(s) within the geo-hash. In other examples, the candidate POI(s) within in the geo-hash can be determined (or narrowed) based on, for example, the associated metadata (e.g., merchant name, merchant ID, address, or any other metadata field with identifying information).

At block 718, a determination of whether there is a unique match between the candidate POI(s) and the transaction data. For example, when one candidate POI is determined (e.g., in block 716) or by narrowing the candidate POI(s) with the transaction data, a unique match is determined. In instances where machine learning is used to determine a unique match, a probability the match is correct can also be provided. When the probably is less than a threshold amount ("bad match") the match can be disregarded. When the probably is equal or less than a threshold amount ("good match") the match can be accepted. In some examples, the threshold amount can be 90%. When more than one candidate POI(s) is determined a unique match is not determined. When a unique match is determined, the method can proceed to block 720. When a unique match is not determined, the method can proceed to block 722.

At block 720, the transaction and a POI are uniquely matched. The transaction data including associated metadata of the transaction can be used to verify/validate the POI (and the POI metadata). The verified/validated transaction data can be used to update the POI (and the POI metadata). For example, a POI could be missing information or have incorrect information (hours of operation, location, etc.) and the transaction metadata can be used to accurately update the POI. In some examples, the transaction data, associated metadata and POI can be stored in a database, POI index, etc. (e.g., for use in future matching algorithms, machine learning models, etc.). In some examples, ambiguities between the POI metadata and the transaction data can be resolved by updating the POI metadata to correspond with that of the transaction, for example, on map application 102 and/or wallet application 202.

At block 722, ambiguities between the transaction data and the candidate POI(s) can be resolved. For example, when there is more than one candidate POI that was determined (in the geo-hash or to be a match), ambiguities exist between the transaction data and the POI in which the transaction actually took place. The ambiguities can be resolved in a variety of ways, illustrated below, however this list is not exhaustive or limiting. In some examples, ambiguities can be resolved by using one or more combinations of the associated metadata. For example, when there are two candidates with the same (or similar) merchant names (e.g., Safeway Fuel, Safeway Market, Safeway pharmacy, etc.) a match can be determined by using the merchant name and the timestamp of the transaction (e.g., only Safeway Fuel is open at 2:00 AM, the time of the transaction). In other examples, different or multiple combinations of metadata (from the transaction or mobile phone) can be used to determine a match. In other examples, contextual matching can be used to determine a match. In other examples, categories can be used to determine a match. In some examples, a subset of the candidate POI(s) can be determined (e.g., partial resolving the ambiguity). The subset can be used in subsequently attempts to resolve the transaction. After the ambiguities are attempted to be resolved, the method 710 can proceed to block 752 of method 750 of FIG. 7D.

Figure 7C:
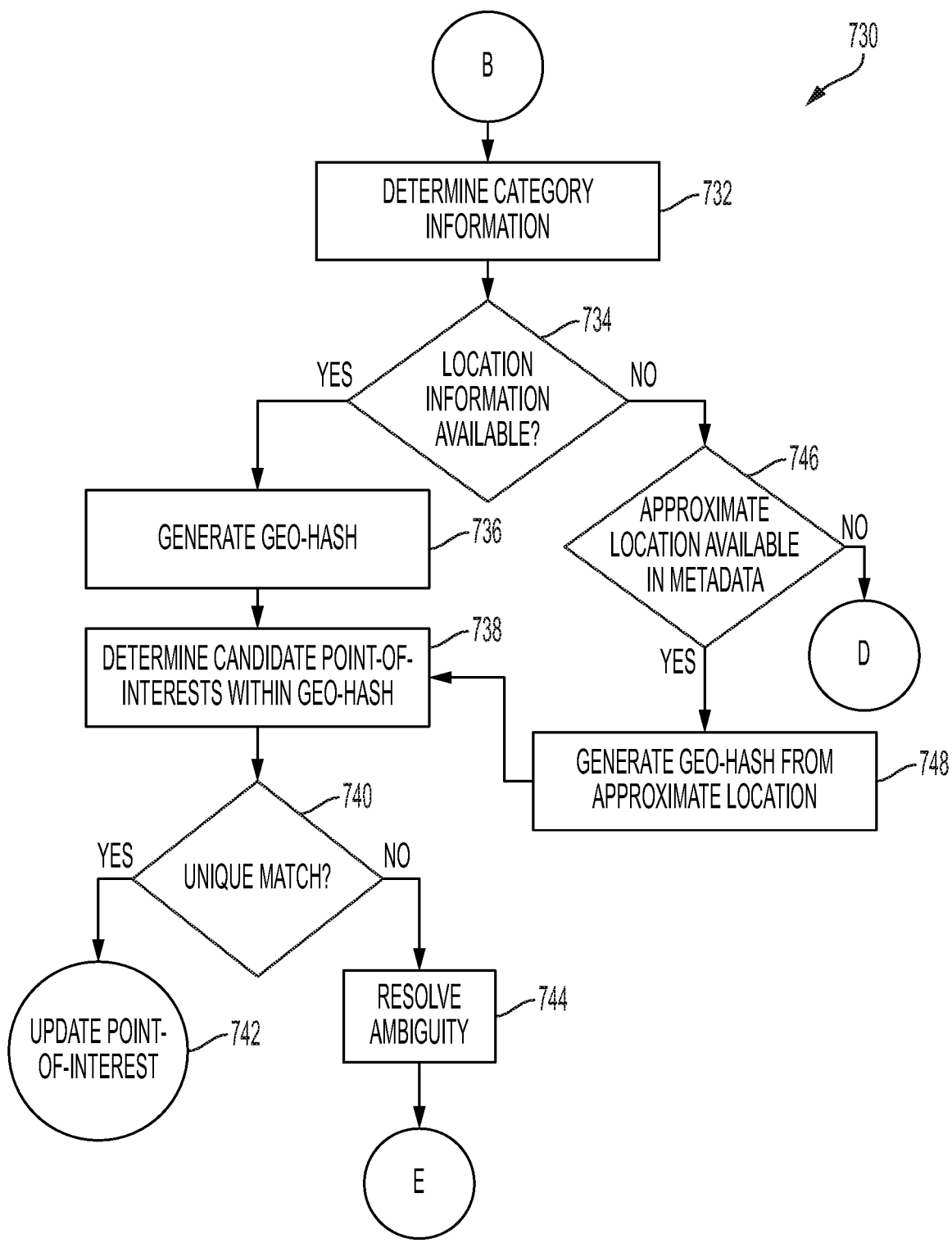
Figure 7D:
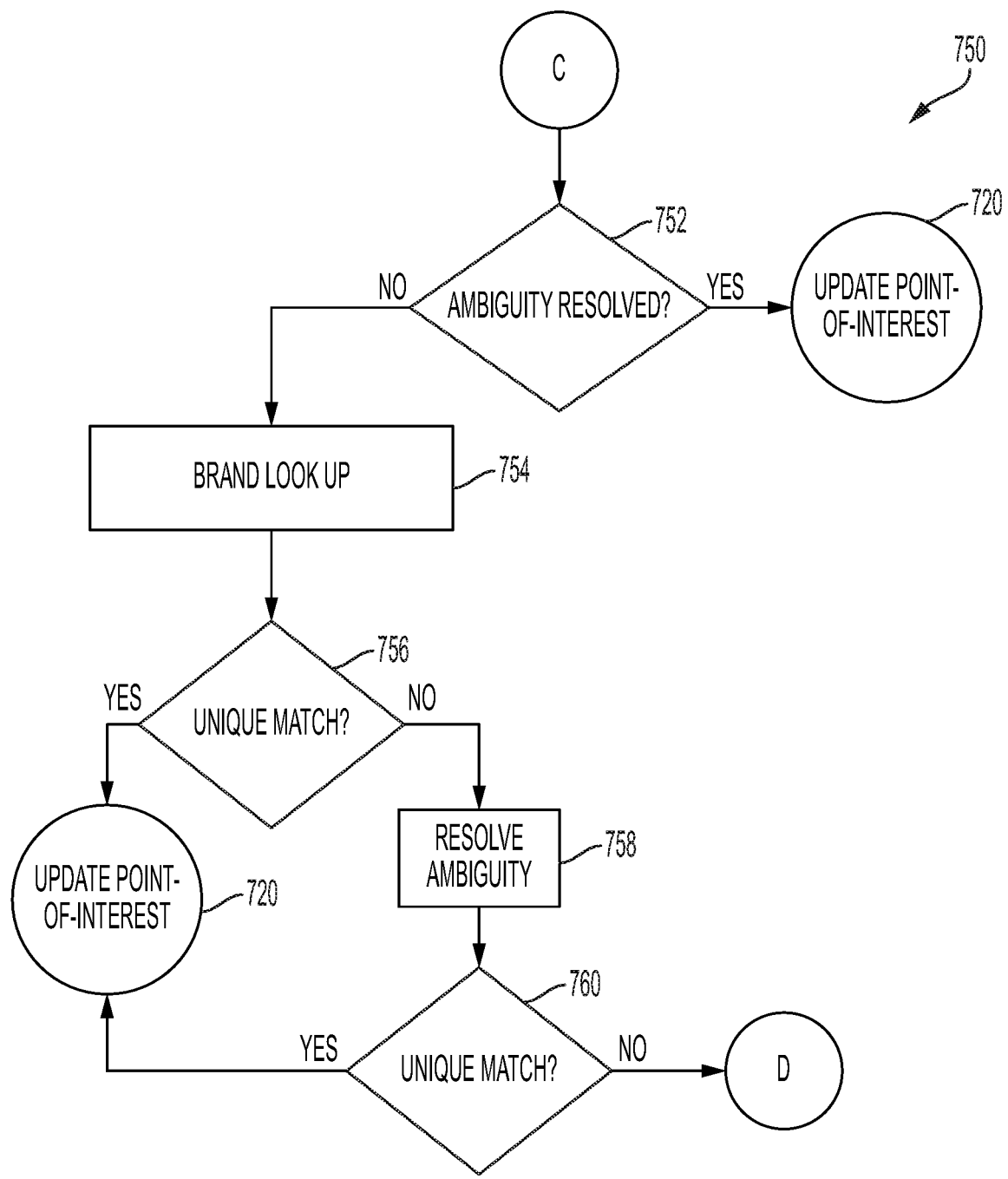

At block 752 of FIG. 7D, a determination can be made as to whether the ambiguities has been resolved. For example, an ambiguity can be resolved when the transaction and a POI are uniquely matched. When the ambiguity is resolved, the method can proceed to block 720. When the ambiguity is not resolved, the method can proceed to block 754.

At block 754, a brand lookup can be performed. Brands, as explained below, can include a plurality of POI(s) that are related. Brand data (e.g., part of the transaction data) can be used to reduce the candidate POI(s) to those candidate POI(s) that match the Brand data.

At block 756, a determination of whether there is a unique match between the candidate POI(s) and the Brand data. For example, when metadata of one candidate POI matches the Brand data, a unique match is determined. When a unique match is determined, the method can proceed to block 720. When a unique match is not determined, the method can proceed to block 758.

At block 758, ambiguities between the Brand data and the candidate POI(s) can be resolved. For example, when there is more than one candidate POI that was determined to be a match with the Brand data, ambiguities exist between the Brand data and the POI in which the transaction actually took place. The ambiguities can be resolved in a variety of ways, illustrated below, however this list is not exhaustive or limiting. In some examples, a second subset of the candidate POI(s) can be determined based on matches with the Brand data (e.g., partial resolving the ambiguity). The second subset can be used in subsequently attempts to resolve the transaction. In some examples, ambiguities can be resolved by using one or more combinations of the associated metadata and Brand data.

In some instances, resolving ambiguities using Brand data and the candidate POI(s) can involving a cleaning process. The cleaning process can include a rule based model or a machine learning model (e.g., random forest, etc.). For example, the rule based model can compare the string similarity between merchant code and Brand attributes (e.g., brand name, brand URL, etc.). In some examples, the comparison can be at the tokens level and character level. In some examples, the merchant code can be removed from a Brand if the similarity score is below a threshold. In another example, the machine learning model can use string similarity scores as features, in addition to similarity between merchant code and brand name/URL. The machine learning model can also use similarities between transaction category and brand category as features. In some examples, a merchant code needs to pass both the rule based model and the machine learning model to become a valid merchant name for Brands.

At block 760, a determination can be made as to whether the ambiguity has been resolved and a unique match is determined. For example, the ambiguity can be resolved when the transaction and a POI are uniquely matched. When the ambiguity is resolved, the method can proceed to block 720. When the ambiguity is not resolved, the method can proceed to block 792 of method 790 of FIG. 7F.

Now turning back to block 712 of method 710 of FIG. 7B. When location information is not available at block 712, the method can proceed to block 724. At block 724, a determination is made if approximate location information is available, for example, in the metadata associated with the transaction. In some examples, location information is not available because the mobile phone is not used and/or the mobile phone has location services turned off. In some examples, location information is not available (or inaccurate) because the transaction is a "virtual transaction" (e.g., transaction with a mobile app to a merchant location where the mobile device is not currently present).

In some examples, a reverse geocode function can be used to determine an approximate location. In some examples, the metadata associated with the transaction can include an address, zip code, etc. When the location of the transaction can be approximated, the method can proceed to block 726. When the location of the transaction cannot be approximated, the method can proceed to block 792 of method 790 of FIG. 7F.

At block 726, a geo-hash (geofence) can be generated based on the approximate location information. For example, when a zip code is ascertained, the geo-hash can be the entire geographic location of the zip code (or created around the center of the zip code). In other examples, when an address or partial address is provided, a geo-hash can be generated with the address/partial address as the center of the geo-hash. When the geo-hash is generated the method can proceed to block 716.

Turning now to block 708 of method 700 of FIG. 7A. At block 708, it was determined the transaction type of a card payment. For example, the card payment type transaction can be that of a specific bank card or credit card, for example Apple Card. In some examples, the card payment type can be a physical swipe (magnetic, chip or NFC) or a virtual interaction using the card stored in an electronic medium. The card payment type transaction can include additional metadata, for example, merchant category code (e.g., a four-digit code that denotes the type of business or service (e.g., classification) of the business that process transaction). When it is determined the transaction type is a card payment, the method can proceed to block 732 or method 730 of FIG. 7C.

At block 732, the category information can be determined. For example, the merchant category code can be used to the type of business of service that processed the transaction.

At block 734, a determine is made as to whether location information is available. For example, the computing device can determine if location information (e.g., lat/long) was received with the transaction data. In some examples, an application from the mobile device (e.g., maps, wallet, etc.) can store the location information of the mobile device (e.g., at the time of the transaction). The location information from the transaction can then be transmitted at any time after the completion of the transaction. In some examples, the current location can be the location of the mobile device at the time it is sent from the mobile device to the computing device. The location of the mobile device at the time of the transaction can be extrapolated based on the current location and the additional metadata (e.g., timestamp, time delta, etc.).

At block 736, a geo-hash can be generated based on the location information. For example, the geo-hash (or geofence) can be generated around the location information of the transaction. In other examples, the location can be extrapolated from the additional metadata. The size and shape of the geofence can be generated based on a threshold value, as described above.

At block 738, candidate POI(s) within the geo-hash can be determined. In some examples, the candidate POI(s) can be all known POI(s) within the geo-hash. For example, a plurality of POI(s) (and their known locations) can be stored in a database, index, etc. (e.g., POI index) which can be accessed to determine POI(s) within the geo-hash. In other examples, the candidate POI(s) within in the geo-hash can be determined (or narrowed) based on, for example, the associated metadata (e.g., merchant name, merchant ID, address, or any other metadata field with identifying information).

At block 740, a determination of whether there is a unique match between the candidate POI(s) and the transaction data. For example, when one candidate POI is determined (e.g., in block 738) or by narrowing the candidate POI(s) with the transaction data, a unique match is determined. When more than one candidate POI(s) is determined a unique match is not determined. In instances where machine learning is used to determine a unique match, a probability the match is correct can also be provided. When the probably is less than a threshold amount ("bad match") the match can be disregarded. When the probably is equal or less than a threshold amount ("good match") the match can be accepted. In some examples, the threshold amount can be 90%. In the example when one candidate POI is determined, a unique match is determined. When more than one candidate POI(s) is determined, a unique match is not determined. When a unique match is determined, the method can proceed to block 720. When a unique match is not determined, the method can proceed to block 744.

At block 744, ambiguities between the transaction data and the candidate POI(s) can be resolved. For example, when there is more than one candidate POI that was determined (in the geo-hash or to be a match), ambiguities exist between the transaction data and the POI in which the transaction actually took place. The ambiguities can be resolved in a variety of ways, illustrated below, however this list is not exhaustive or limiting. In some examples, ambiguities can be resolved by using one or more combinations of the associated metadata. For example, when there are two candidates with the same (or similar) merchant names (e.g., Safeway Fuel, Safeway Market, Safeway pharmacy, etc.) a match can be determined by using the merchant name and the timestamp of the transaction (e.g., only Safeway Fuel is open at 2:00 AM). In other examples, different or multiple combinations of metadata (from the transaction or mobile phone) can be used to determine a match. In other examples, contextual matching can be used to determine a match. In other examples, categories can be used to determine a match. In some examples, a subset of the candidate POI(s) can be determined (e.g., partial resolving the ambiguity). The subset can be used in subsequently attempts to resolve the transaction. After the ambiguities is attempted to be resolved, the method 730 can proceed to block 772 of method 770 of FIG. 7E.

Figure 7E:
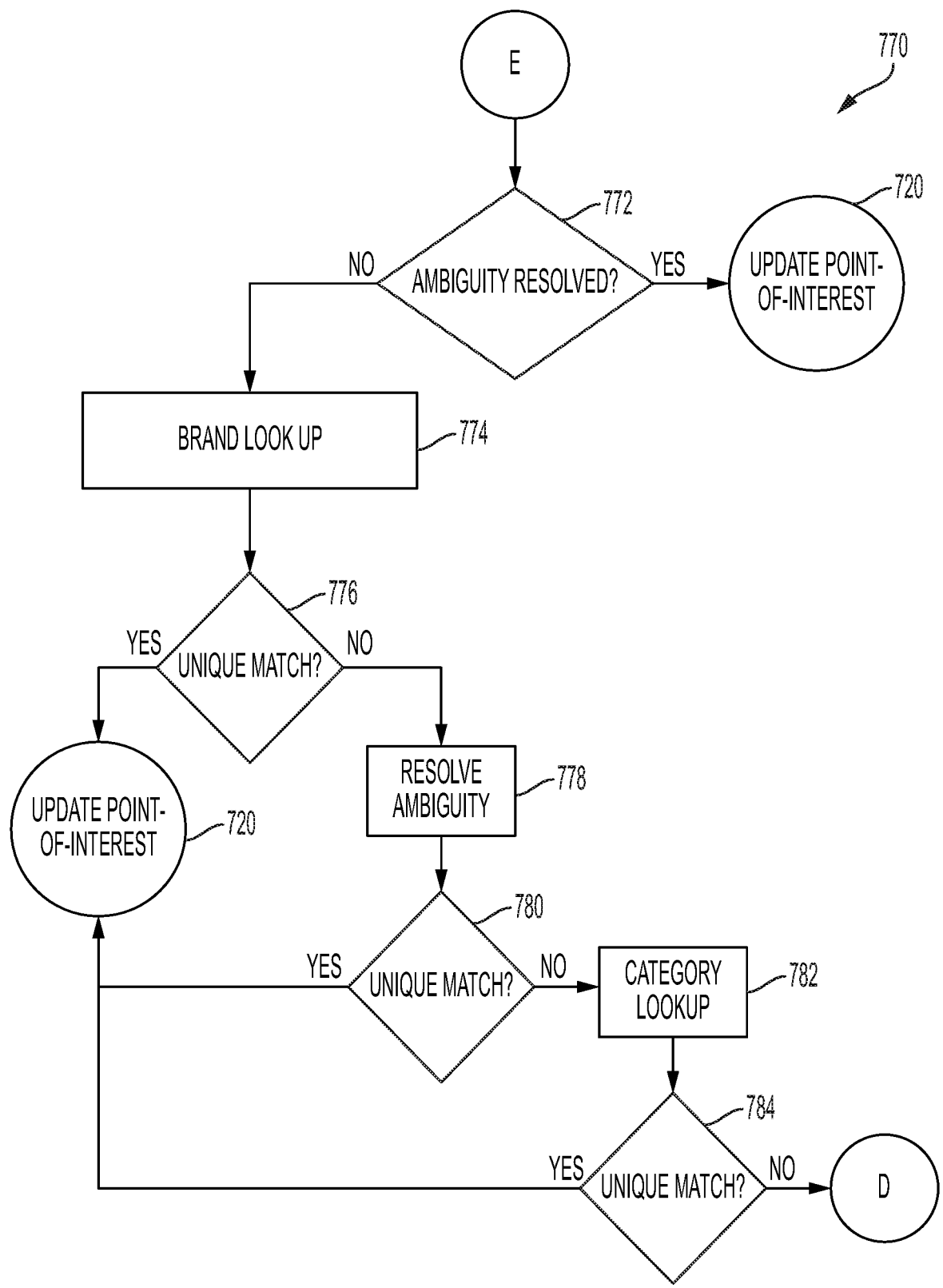

At block 772 of FIG. 7E, a determination can be made as to whether the ambiguities has been resolved. For example, an ambiguity can be resolved when the transaction and a POI are uniquely matched. When the ambiguity is resolved, the method can proceed to block 720. When the ambiguity is not resolved, the method can proceed to block 774.

At block 774, a brand lookup can be performed. Brands, as explained below, can include a plurality of POI(s) that are related. Brand data (e.g., part of the transaction data) can be used to reduce the candidate POI(s) to those candidate POI(s) that match the Brand data.

At block 776, a determination of whether there is a unique match between the candidate POI(s) and the Brand data. For example, when metadata of one candidate POI matches with the Brand data, a unique match is determined. When a unique match is determined, the method can proceed to block 720. When a unique match is not determined, the method can proceed to block 778.

At block 778, ambiguities between the Brand data and the candidate POI(s) can be resolved. For example, when there is more than one candidate POI that was determined to be a match with the Brand data, ambiguities exist between the Brand data and the POI in which the transaction actually took place. The ambiguities can be resolved in a variety of ways, illustrated below, however this list is not exhaustive or limiting. In some examples, a second subset of the candidate POI(s) can be determined based on matches with the Brand data (e.g., partial resolving the ambiguity). The second subset can be used in subsequently attempts to resolve the transaction. In some examples, ambiguities can be resolved by using one or more combinations of the associated metadata and Brand data.

In some instances, resolving ambiguities using Brand data and the candidate POI(s) can involving a cleaning process. The cleaning process can include a rule based model or a machine learning model (e.g., random forest, etc.). For example, the rule based model can compare the string similarity between merchant code and Brand attributes (e.g., brand name, brand URL, etc.). In some examples, the comparison can be at the tokens level and character level. In some examples, the merchant code can be removed from a Brand if the similarity score is below threshold. In another example, the machine learning model can use string similarity scores as features, in addition to similarity between merchant code and brand name/URL. The machine learning model can also use similarities between transaction category and brand category as features. In some examples, a merchant code needs to pass both the rule based model and the machine learning model to become a valid merchant name for Brands.

At block 780, a determination can be made as to whether the ambiguity has been resolved and a unique match is determined. For example, the ambiguity can be resolved when the transaction and a POI is uniquely matched. When the ambiguity is resolved, the method can proceed to block 720. When the ambiguity is not resolved, the method can proceed to block 782.

At block 782, category lookup can be performed. For example, the merchant category code can be used to match remaining candidate POI(s) (e.g., from the subsets of the candidate POI(s) from previous attempts to resolve ambiguities). In some examples, the four digit code (merchant category code) can be used to match with the candidate POI(s) metadata (e.g., category) to determine a unique match.

At block 784, a determination can be made as to whether the ambiguity has been resolved and a unique match is determined. For example, the ambiguity can be resolved when the transaction and a candidate POI is uniquely matched, in this instance based on category information. When the ambiguity is resolved, the method can proceed to block 720. When the ambiguity is not resolved, the method can proceed to block 792 of method 790 of FIG. 7F.

Now turning back to block 734 of method 730 of FIG. 7C. When location information is not available at block 734, the method can proceed to block 746. At block 746, a determination is made if approximate location information is available, for example, in the metadata associated with the transaction. In some examples, location information is not available because the mobile phone is not used and/or the mobile phone has location services turned off. In some examples, location information is not available (or inaccurate) because the transaction is a "virtual transaction" (e.g., transaction with a mobile app to a merchant location where the mobile device is not currently present).

In some examples, a reverse geocode function can be used to determine an approximate location. In some examples, the metadata associated from the transaction can include an address, zip code, etc. For example, merchantCANL can include information regarding the location of the transaction. When the location of the transaction can be approximated, the method can proceed to block 748. When the location of the transaction cannot be approximated, the method can proceed to block 792 of method 790 of FIG. 7F.

At block 748, a geo-hash (geofence) can be generated based on the approximate location information. For example, when a zip code is ascertained, the geo-hash can be the entire geographic location of the zip code (or created around the center of the zip code). In other examples, when an address or partial address is provided, a geo-hash can be generated with the address/partial address as the center of the geo-hash. When the geo-hash is generated the method can proceed to block 738.

Figure 7F:
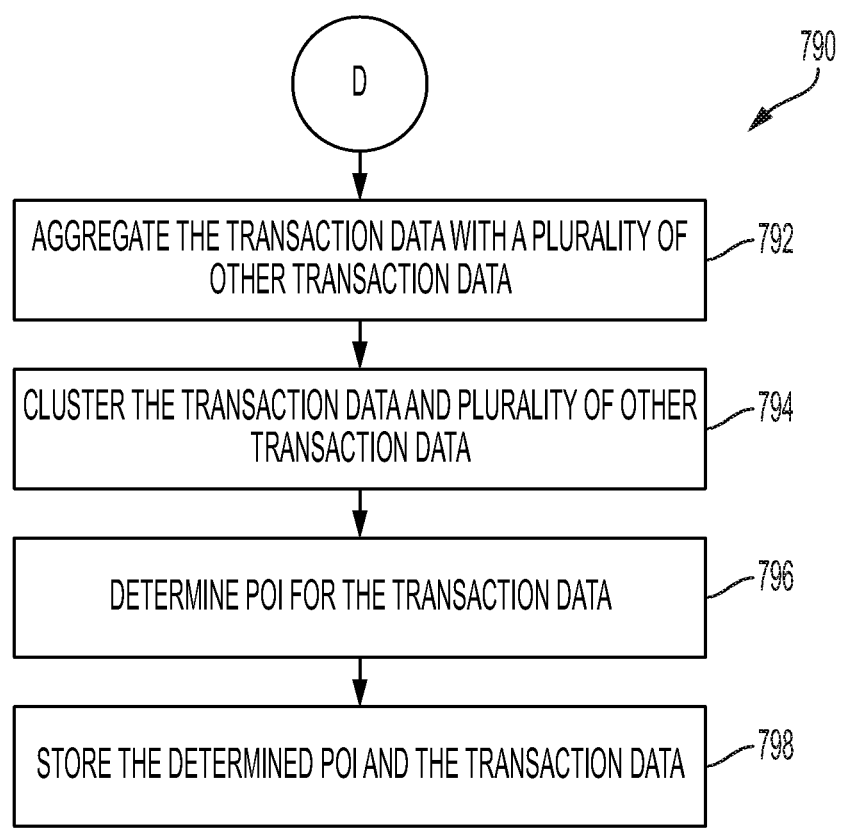

Turning now to block 792 of method 790 of FIG. 7F. Method 790 illustrates an offline matching of the transaction with a POI. For example, when the online matching is unsuccessful, historical transaction data (e.g., along with machine learning techniques) can be used to resolve the transaction with a POI. When offline matching is successful, the POI metadata can be updated and the data used in resolve the match can be used in resolving future matches/ambiguities.

At block 792, a computing system can receive and aggregate the transaction data with a plurality of other transaction data (e.g., similar transactions, transaction type, etc.). The transaction data can include, but in not limited to transaction data points 355 and phone data points 365. In some examples, the transaction data can be for a predetermined period of time.

At block 794, the transaction data with the plurality of other transaction data can be clustered. For example, the transaction data and other transaction data can be clustered (into one or more clusters) based on locations of the transactions, the plurality of transactions can be segmented into quadrants (e.g., geo-hashed) as shown, for example, in FIG. 3. In other examples, the transaction data and other transaction data can be clustered based on similarities/combinations and/or partial matches (e.g., based on one or more thresholds) of the associated metadata of the transaction data (e.g., transaction data points 355 and phone data points 365). In other examples, the clustering can be based on a combination of location information and transaction data.

In some examples, the clusters can include attributes. For example, the attributes can include historical or over a period to time transactions, contextual information regarding the transactions, etc.

At block 796, the one or more of the clusters of transaction data with the plurality of other transaction data can be used to determine a POI. In some examples, the one or more of the clusters of transaction data with the plurality of other transaction data can be used as input into a machine learning environment. In some examples, there can be multiple machine learning environments. For example, there can be trained machine learning environments based on the transaction type (card payment, mobile payment). In other examples, the trained machine learning environment can be trained with a combination of data, including transaction type, location information, and transaction data and POI metadata, and matches thereof. The one or more clusters can be used as input into the machine learning environment (e.g., the machine learning environment that will be most successful in resolving the POI). For example, when the transaction type is a mobile payment, the machine learning environment that is trained with mobile payment transaction data should be utilized.

At block 798, when a POI is resolved to the transaction, the data can be stored in a database/index (e.g., POI index, etc.). In some examples, inaccuracies in the POI metadata can be resolved by updating the POI metadata to correspond with that of the transactions, for example, on map application 102 and/or wallet application 202. In other examples, the data can be used to verify/validate the POI as shown in block 720.

In some examples, a POI cannot be resolved, for example, when it does not yet exist in the database (e.g., POI index, etc.). In these instances, a POI can be created and stored in the database for use in resolving future transactions.

While the above have been described in relation to examples, there are other examples as well, which are described below. However these are non-limiting and used as examples for illustration.

Hours: depending on number of transactions and hours data on the POI, the errors in the hours can be recognized and can be inferred if a sufficient number of transactions are associated to the POI.

POI location: if the transaction locations have relatively precise horizontal accuracy and low time of transaction to GPS and are consistently in a different location than where maps application has the POI (e.g. about 100 meters south), the POI location can be flagged for review and/or automatically corrected.

POI category: if transaction categories are different than POI category, but the location data shows the transactions happening at the POI, a review of the category of the POI can take place. A determination that the categorization of the POI is incorrect based on the time of transaction (e.g., for a gym, transactions that occur between 8 PM and 2 AM, heavier on the weekends—it looks like it may be a bar and not a gym).

POI seasonality: based on transaction starting and stopping over the year, it may be determined the POI is seasonal and display it as such on the map (e.g. only open during summer)

POI existence: if transactions begin to show that they are coming from a POI, or even a particular Brand (they all have PEETs), but we know there is no POI in that location (in maps application), a POI can be created and/or a fraud alert could be created. Similarly, the consistency and presence of transactions near a POI may confirm its existence and open to customers state even if other data providers or internal signals may indicate the POI is closed. (e.g., it is unlikely that the POI went out of business if there have been no observed changes in transaction cadence, regardless of what a review may claim).

In the absence of transactions at a POI of a particular category or Brand that is consistently associated with transactions in a particular locations may indicate an incorrect/non-existent POI in the map application (e.g., metadata). For example, all McDonald's locations have at least some transactions, but there has never been one near a particular McDonald's that it can be associates to. Perhaps it is not actually there in the real world.

As described above, POIs and Brands are related in that a Brand can be a collection of POIs. POI metadata includes merchant information. The merchant information is aggregated and populated from POIs associated with the Brand onto a Brand merchant information fields. When populating Brand merchant information it is important to have precise information describing the Brand to avoid ambiguities (e.g., which can hinder resolving a transaction). For example, when there is a single McDonald's on a street, merchant information may easily contain the name of that street and no reference to McDonald's brand name. This may still be sufficient information to correctly match a transaction to the POI (i.e., McDonald's on that street). However, this is an issue when such information is populated into a Brand merchant information because any transaction occurring at an unrelated POI on an a similarly named street within the country may match to this Brand. Brand relationship can play an important part in resolving transactions to a POI or Brand.

A non-limiting example model of Brand and sub-Brands is shown below. Brand relationships can enable resolution of transactions both on POIs and among sub-Brands and correct grouping of transactions.

PARENT_OF/CHILD_OF
  Represented as two directional edges on the graph between Parent and Child Brand entities
  This relationship relates Brands (parents) and sub-Brands (children) that serve a niche of products, services or audiences distinct from their parent Brand
  On the map, POIs tagged with Brands related as "parent/child" can be contained within each other or stand-alone.
  Transaction fallback: In case of merchant name ambiguity between parent and child POI at the same address, transaction can be resolved to parent POI or a Brand.
  Transaction grouping: transactions can be grouped using PARENT_OF/CHILD_OF Brand relationship.
  Examples of businesses:
    Safeway—parent Brand
    Safeway Pharmacy—child Brand
    Safeway Fuel Station—child Brand
    Edges on the graph:
    Safeway PARENT_OF Safeway Pharmacy
    Safeway Pharmacy CHILD_OF Safeway
VARIANT_OF
  Represented as two directional edges on the graph between two Brand variants
  This relationship relates Brands distinct but interchangeable, synonyms, or co-located businesses referencing each other
  One of the brand variants may carry primary variant attribute/flag
  On the map, POIs of Brands related as "variant of" are not located at the same address
  Transaction fallback: in case of ambiguity, main variant Brand can be used.

Figure 8:
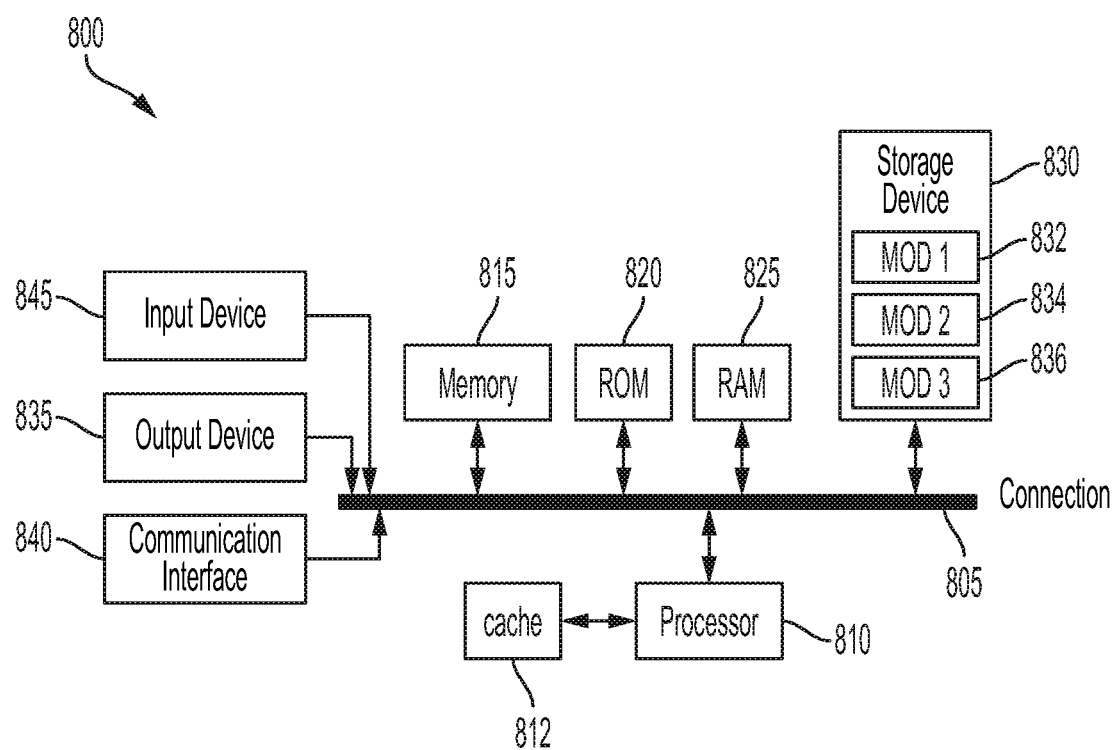
FIG. 8 illustrates an example computing device.

Transaction grouping: transactions can be grouped using variant of relationship to main variant Brand
Examples of businesses:
  Store variants based on store size
    Walmart—primary variant
    Walmart Neighborhood Market—variant
    Walmart Supercenter—variant
  Outlet store variants:
    Gap
    Gap Outlet
  Co-located entities
    Dunkin' Donuts
    Dunkin' Donuts & Baskin Robbins
ABSTRACT_OF/SPECIFIC_OF
Represented as two directional edges on the graph between abstract and specific Brand entities
Abstract Brand entity is most generalized common parent organization that may not necessarily have manifestation at the specific geographic location
Specific Brand entity is physical or virtual sub-business or sub-Brand is Abstract entity. It may represent sub-business specific to some region or business with unique branding.
On the map, Abstract Brands are used in case of absences of more specific Brand.
Transaction fallback:
  in case of merchant name ambiguity between Specific and Abstract brand, transaction can default to Abstract Brand.
  in case of In-App transactions for businesses with the same app, transaction will default to an Abstract Brand.
Transaction grouping: transactions can be grouped using abstract Brand from all specific brand entities
Examples:
  Marriott International/Marriott Bonvoy—parent organization/common
    app—abstract Brand with no physical location on the map
    Courtyard by Marriott—specific Brand
    SpringHill Suites by Marriott—specific Brand
    Edges on the graph:
      Marriott International/Marriott Bonvoy ABSTRACT_OF Courtyard by Marriott
      Courtyard by Marriott SPECIFIC_OF SpringHill Suites by Marriott
  YCMA—abstract Brand
    YMCA of San Diego County—specific Brand
    YMCA of Santa Clara Valley—specific Brand
  Edges on the graph:
    YMCA ABSTRACT_OF YMCA of San Diego County
    YMCA of San Diego County SPECIFIC_OF YMCA
PARTNERSHIP_WITH
Represented as two directional edges on the graph in the data model between two Brands in PARTNERSHIP_WITH relationship
This relationship defines businesses that do not belong to the same parent organization, but frequently perform business at the same physical location.
On the map, different POIs tagged with Brands related by PARTNERSHIP_WITH relationship can be located at the same address
Transaction fallback: in combination with other POI attributes this Brand relationship may indicate correct direction for matching transaction to a POI entity
Examples:
  Safeway PARTNERSHIP_WITH Starbucks
  Macy's PARTNERSHIP_WITH Sunglass Hut
DIFFERENT_FROM
Represented as two directional edges on the graph in the data model between two brands in DIFFERENT_FROM relationship
This relationship relates very similar by attributes but non-duplicate Brands that are different
On the map, POIs of Brands related as "different from" may be located at different address if there is no common parent Brand, or may be located at the same address given a common parent Brand
Transaction fallback: between Brands in DIFFERENT_FROM relationship, transaction may be resolved to a common Brand parent Brand if such common parent exists.
Transaction grouping: between Brands in DIFFERENT_FROM relationship, transaction can be grouped to a common Brand parent Brand if such common parent exists.
Examples:
  Walmart Bakery DIFFERENT_FROM Walmart Pharmacy (same parent Brand Walmart)
  First Bank DIFFERENT_FROM First Republic Bank (not related via parent Brand)
BEFORE/AFTER
Represented as two directional edges on the graph between Before and After Brand entities
This relationship identifies previous BEFORE Brand that was rebranded into/or acquired by AFTER Brand
On the map, this relationship allows AFTER Brand to overwrite visible branded POI attributes
Transaction fallback: transaction may correctly resolve to a new Brand entity
Transaction grouping: transactions may resolve to new AFTER Brand
Examples:
  CVS Pharmacy—after Brand
  Target Pharmacy—before Brand
  Edges on the graph:
    Target Pharmacy AFTER CVS Pharmacy
    CVS Pharmacy BEFORE Target Pharmacy FIG. 8 shows an example of computing system 800, which can be for example any computing device making up (e.g., mobile device 100, server, mobile telephone, smartphone, smartwatch, tablet, personal digital assistant, etc.) or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system

800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium having stored thereon a sequence of instructions that, when executed by a processor of a computing device, causes the computing device to:
    receive a notification of a transaction using an account associated with a mobile device, the notification also including transaction metadata;
    determine a transaction type based at least in a part on whether the transaction is made via a payment application or via a physical card, the transaction type identified in the transaction metadata; and
    in accordance with a determination that the transaction type identifies the transaction was made via the physical card:

identify a difference between the transaction metadata and metadata associated with a point-of-interest based at least in part on the determination that the transaction is made via the physical card;

update map application user interface information to identify the difference between the transaction metadata and the metadata associated with the point-of-interest; and transmit the updated map application user interface information to a map application of the mobile device.

2. The non-transitory computer-readable medium of claim 1, further comprising instructions which when executed, causes the computing device to:

validate metadata associated with the at least one point-of-interest based at least in part on the transaction metadata, wherein the metadata associated with the at least one point-of-interest is stored at an application server.

3. The non-transitory computer-readable medium of claim 1, further comprising instructions which when executed, causes the computing device to:

receive a plurality of transactions and associated transaction metadata, including the transaction using the account associated with the mobile device;

cluster the plurality of transactions into one or more subset clusters;

identify a center point transaction for each of the one or more subset clusters; and reduce the one or more subset clusters based at least in part on a comparison of metadata of the center point transaction and transaction metadata of the subset of the plurality of transactions.

4. The non-transitory computer-readable medium of claim 3, wherein the plurality of transactions are clustered by location.

5. The non-transitory computer-readable medium of claim 3, further comprising instructions which when executed, causes the computing device to:

subsequent to the clustering, geo-hash the plurality of transactions based at least in part on the respective associated transaction metadata.

6. The non-transitory computer-readable medium of claim 1, wherein identifying the difference between the transaction metadata and the metadata associated with the point-of-interest comprises:

determining a first category type identified in the transaction metadata based at least in part on the determination that the transaction is made via the physical card;

determining a second category type identified in the metadata associated with the point-of-interest; and identifying a difference between the first category type identified in the transaction metadata and the second category type identified in the metadata associated with the point-of-interest.

7. A system comprising:

at least one processor; and at least one memory storing instructions which, when executed by the at least one processor, cause the at least one processor to:

receive a notification of a transaction using an account associated with a mobile device, the notification also including transaction metadata;

determine a transaction type based at least in part on whether the transaction is made via a payment application or via a physical card, the transaction type identified in the transaction metadata; and in accordance with a determination that the transaction type identifies the transaction was made via the physical card:

identify a difference between the transaction metadata and metadata associated with a point-of-interest based at least in part on the determination that the transaction is made via the physical card;

update map application user interface information to identify the difference between the transaction metadata and the metadata associated with the point-of-interest; and transmit the updated map application user interface information to a map application of the mobile device.

8. The system of claim 7, wherein the memory further comprising instructions which when executed, causes the at least one processor to:

validate metadata associated with the at least one point-of-interest based at least in part on the transaction metadata, wherein the metadata associated with the at least one point-of-interest is stored at an application server.

9. The system of claim 7, wherein the memory further comprising instructions which when executed, causes the at least one processor to:

receive a plurality of transactions and associated transaction metadata, including the transaction using the account associated with the mobile device;

cluster the plurality of transactions into one or more subset clusters;

identify a center point transaction for each of the one or more subset clusters; and reduce the one or more subset clusters based at least in part on a comparison of metadata of the center point transaction and transaction metadata of the subset of the plurality of transactions.

10. The system of claim 9, wherein the plurality of transactions are clustered by location.

11. The system of claim 9, wherein the memory further comprising instructions which when executed, causes the at least one processor to:

subsequent to the clustering, geo-hash the plurality of transactions based at least in part on the respective associated transaction metadata.

12. The system of claim 7, wherein identifying the difference between the transaction metadata and the metadata associated with the point-of-interest comprises:

determining a first category type identified in the transaction metadata based at least in part on the determination that the transaction is made via the physical card;

determining a second category type identified in the metadata associated with the point-of-interest; and identifying a difference between the first category type identified in the transaction metadata and the second category type identified in the metadata associated with the point-of-interest.

13. A method comprising:

receiving a notification of a transaction using an account associated with a mobile device, the notification also including transaction metadata;

determining a transaction type based at least in part on whether the transaction is made via a payment application or via a physical card, the transaction type identified in the transaction metadata; and in accordance with a determination that the transaction type identifies the transaction was made via a physical card:

identifying a difference between the transaction metadata and metadata associated with a point-of-interest based at least in part on the determination that the transaction is made via the physical card;

updating map application user interface information to identify the difference between the transaction metadata and the metadata associated with the point-of-interest; and transmitting the updated map application user interface information to a map application of the mobile device.

14. The method of claim 13, further comprising:
validating metadata associated with the at least one point-of-interest based at least in part on the transaction metadata, wherein the metadata associated with the at least one point-of-interest is stored at an application server.

15. The method of claim 13, further comprising:
receiving a plurality of transactions and associated transaction metadata, including the transaction using the account associated with the mobile device;

clustering the plurality of transactions into one or more subset clusters;

identifying a center point transaction for each of the one or more subset clusters; and reducing the one or more subset clusters based at least in part on a comparison of metadata of the center point transaction and transaction metadata of the subset of the plurality of transactions.

16. The method of claim 15, wherein the plurality of transactions are clustered by location.

17. The method of claim 13, wherein identifying the difference between the transaction metadata and the metadata associated with the point-of-interest comprises:

determining a first category type identified in the transaction metadata based at least in part on the determination that the transaction is made via the physical card;

determining a second category type identified in the metadata associated with the point-of-interest; and identifying a difference between the first category type identified in the transaction metadata and the second category type identified in the metadata associated with the point-of-interest.

\* \* \* \* \*

UNITED STATES PATENT AND TRADEMARK OFFICE
CERTIFICATE OF CORRECTION

PATENT NO. : 11,698,269 B2
APPLICATION NO. : 16/828929
DATED : July 11, 2023
INVENTOR(S) : Shanni A. Weilert et al.

Page 1 of 1

It is certified that error appears in the above-identified patent and that said Letters Patent is hereby corrected as shown below:

On the Title Page

After item (22) Filed: Mar. 24, 2020, please add item (60):
--Related U.S. Application Data
Provisional Application No. 62/822,921, filed on Mar. 24, 2019--

Signed and Sealed this
Twelfth Day of September, 2023

Katherine Kelly Vidal
*Director of the United States Patent and Trademark Office*